United States Patent [19]

Koshiba et al.

[11] Patent Number: 5,787,426
[45] Date of Patent: Jul. 28, 1998

[54] DATA SORTING, DATA SORTING TREE CREATING, DERIVATIVE EXTRACTING AND THESAURUS CREATING APPARATUS AND METHOD, OR DATA PROCESSING SYSTEM

[75] Inventors: Takeshi Koshiba; Yasubumi Sakakibara, both of Kawasaki, Japan

[73] Assignee: Fujitsu Limited, Kawasaki, Japan

[21] Appl. No.: 408,304

[22] Filed: Mar. 22, 1995

[30] Foreign Application Priority Data

Apr. 28, 1994 [JP] Japan ................. 6-091517
Feb. 10, 1995 [JP] Japan ................. 7-022697

[51] Int. Cl.$^6$ ........................... G06F 17/30
[52] U.S. Cl. ................. 707/7; 707/3; 707/5; 707/532
[58] Field of Search ................. 395/600, 603, 395/605, 607; 707/7, 3, 5, 532

[56] References Cited

U.S. PATENT DOCUMENTS 5,274,505  12/1993  Ferguson et al. ............... 395/600

*Primary Examiner*—Thomas G. Black
*Assistant Examiner*—Cheryl R. Lewis
*Attorney, Agent, or Firm*—Staas & Halsey

[57] ABSTRACT

Derivatives representing character string candidates are created from a list of examples of character data. The sorting attribute of the derivatives representing character string candidate is evaluated relating to each example of the character data and a derivatives representing character string is labeled to an internal node. At the same time, the sorting attribute of the derivatives representing character string selected is evaluated relating to each example of the character data to thereby successively sort the example of each character data and create a data sorting tree. New character data is sorted using the data sorting tree. On the other hand, a thesaurus of desired character data is automatically created as a word linked to the derivatives representing character string which is labeled to each internal node present on a path extending along the data sorting tree, or as a word linked to a negative of the derivative representing character string.

25 Claims, 16 Drawing Sheets

```
00 !THE WORLD OF LEARNING 1990
01 !ALGEBRAIC CURVES
01 !COMBINATORIAL GROUP THEORY A TOPOLOGICAL APPROACH
01 !COMMUTATIVE ALGEBRA
01 !COMPUTER ALGEBRA
02 !ADVANCED TOPICS IN ARTIFICIAL INTELLIGENCE
02 !ALGORITHMIC INFORMATION THEORY
02 !AN APPROACH TO KNOWLEDGE BASE MANAGEMENT
02 !COMPUTABILITY COMPLEXITY LOGIC
02 !COMPUTER SUPPORTED COOPERATIVE WORK
02 !DESIGN AND IMPLEMENTATION OF SYMBOLIC COMPUTATION SYSTEMS
02 !DISTRIBUTED ALGORITHMS
02 !EFFICIENT STRUCTURES FOR GEOMETRIC DATA MANAGEMENT
02 !PARALLEL DATABASE SYSTEMS
02 !REWRITING TECHNIQUES AND APPLICATIONS
02 !THE COMPUTATIONAL COMPLEXITY OF MACHINE LEARNING
03 !MONTAGUE GRAMMAR
04 !COMPUTER AIDED SYSTEMS THEORY  EUROCAST 89
05 !COMPUTATIONAL MOLECULAR BIOLOGY
05 !CONNECTIONIST MODELS
05 !EYE BRAIN AND VISION
05 !GENETICS OF PATTERN FORMATION AND GROWTH CONTROL
06 !MENTAL PROCESSES
06 !THE READER IN THE TEXT
```

Fig. 5

| SORTING CLASS | | CONTENTS |
|---|---|---|
| 00. | REFERENCE | HANDBOOK, DICTIONARY, LEXICON, EXPLANATORY NOTE, ETC. |
| 01. | MATHEMATICAL SCIENCE | MATHEMATICS, MATHEMATICAL SCIENCE, ETC. |
| 02. | INFORMATION | COMMON INFORMATION, INFORMATION SCIENCE, COMPUTER SCIENCE, ETC. |
| 03. | LINGUISTIC SCIENCE | COMMON LINGUISTICS, SEMANTICS, ETC. |
| 04. | SYSTEM SCIENCE | SYSTEM THEORY, CONTROL ENGINEERING, ROBOTICS, ETC. |
| 05. | BIOLOGICAL SCIENCE | BIOLOGICAL ENGINEERING, NERVE CIRCUIT, DNA/GENE, ETC. |
| 06. | CULTURAL SCIENCE | PHILOSOPHY, PSYCHOLOGY, COGNITIONAL SCIENCE, ETC. |
| 07. | SOCIAL SCIENCE | COMMON SOCIAL SCIENCES, POLICY, CONSTRUCT, ETC. |
| 08. | ENVIRONMENTAL SCIENCE | ENVIRONMENTAL SCIENCE, ETC. |
| 09. | EDUCATION | PEDAGOGIC, ETC. |
| 10. | COMMON ENGINEERING | ELECTRICAL ENGINEERING, ELECTRONIC ENGINEERING, RADIO ENGINEERING, MECHANICAL ENGINEERING, ETC. |
| 11. | PHYSICS | COMMON PHYSICS |

Fig. 6

```
INFO
INFOR
INFORM
INFORMA
INFORMAT
INFORMATI
INFORMATIO
INFORMATION
INFORMATION,
INFORMATION S
INFORMATION SY
INFORMATION SYS
INFORMATION SYST
INFORMATION SYSTE
INFORMATION SYSTEM
COMP
COMPU
COMPUT
COMPUTE
COMPUTER
COMPUTER,
COMPUTER A
COMPUTER AL
COMPUTER ALG
COMPUTER ALGE
COMPUTER ALGEB
COMPUTER ALGEBR
COMPUTER ALGEBRA
```

Fig. 7

```
0 2 ! NEURAL NETWORKS
0 5 ! ADVANCES IN NEURAL INFORMATION PROCESSING SYSTEMS 2
0 5 ! ADVANCES IN NEURAL INFORMATION PROCESSING SYSTEMS 3
0 5 ! ANALOG VLSI AND NEURAL SYSTEMS
0 5 ! INTERNATIONAL JOINT CONFERENCE ON NEURAL NETWORKS
0 5 ! INTERNATIONAL JOINT CONFERENCE ON NEURAL NETWORKS IJCNN 91 SEATTLE VOLUME 1
0 5 ! INTERNATIONAL JOINT CONFERENCE ON NEURAL NETWORKS IJCNN 91 SEATTLE VOLUME 2
0 5 ! NEURAL PRINCIPLES IN VISION
```

Fig. 11

LIST OF LECTURES IN THE DISCRETE EVENT SYSTEM STUDY MEETING → 4

: "aabcac" → IS SORTED INTO 1

| | |
|---|---|
| CALCULATOR | — COMPUTER |
| PHYSICS | — DYNAMICS |
| INFORMATION | — PROGRAM |
| CONTROL | — ROBOT |
| LIST OF LECTURES | — LIST OF ESSAYS |
| SOCIETY | — ECONOMY |
| PLAN | — DESIGN |
| ALGEBRA | |
| WORLD | — CITY |
| LANGUAGE | — ENGLISH |
| JOSEPHONE | — CIRCUIT |

Fig. 16

DATA SORTING, DATA SORTING TREE CREATING, DERIVATIVE EXTRACTING AND THESAURUS CREATING APPARATUS AND METHOD, OR DATA PROCESSING SYSTEM

BACKGROUND OF THE INVENTION

1. Field of the Invention

The present invention relates to a technique for extracting keywords or derivatives and, more particularly, a technique for sorting character data and forming a thesaurus on the basis of a data sorting tree which shows the relationship of keywords or derivatives extracted by the keywords or derivatives extracting technique.

2. Description of the Related Art

As computer techniques are introduced into various fields, data bases of documents and full text types relating to references have been more and more widely used, and great numbers of character data are being computerized to form these data bases. As data bases are being used in this manner, it becomes necessary to establish a technique for retrieving character data.

In order to retrieve character data, it is most common to carry out character data retrieval using keywords or derivatives. In order to carry out character data retrieval with high efficiency and accuracy, and without retrieval loss in this case, it is necessary that a dictionary or thesaurus of synonyms and related characters for character data is created, while appropriately extracting keywords or derivatives and sorting character data on the basis of these keywords or derivatives thus extracted.

However, these works are highly technical and require great amounts of labor. To provide computer assistance, therefore, it is expected to establish techniques for extracting keywords or derivatives, sorting character data on the basis of keywords or derivatives thus extracted, and automatically creating the thesaurus on the basis of the results thus sorted.

Conventional techniques for extracting keywords or derivatives have the following disadvantages:

a) A document expressed by character data is divided into words and a keyword or derivative is extracted from these words thus divided.

In the case of this conventional technique, however, the work of dividing the document into words depends on personal labor and the automation of data sorting is thus made practically impossible.

b) Method of citing the attribute (which will be called sorting attribute) of keywords or derivatives, which are used to sort character data, from data bases and dictionaries.

In the case of this method, keywords or derivatives which are used to sort character data are appropriately selected from dictionaries and used. This method is the most common to extract keywords or derivatives. However, it has the following problems:

i. When a keyword or derivative which is to be extracted is not found in any of the data bases or dictionaries, it is quite difficult to extract this keyword or derivative.

ii. A data base or dictionary must have been created previously, while using to a great extent a highly technical knowledge of keywords or derivatives. This requires great amounts of labor.

iii. When the keywords or derivatives are changed from Japanese into English, for example, the data base or dictionary must be re-created or a new one must be obtained.

c) Method of extracting the sorting attribute of keywords or derivatives on the basis of how many times a word appears in the character data.

This method is based on the assumption that important words appear many times in a document expressed in character data. The number of times every word appears in the document is summed, and it is decided on the basis of the results thus obtained which of these words is more important, and the sorting attribute of keywords or derivatives is thus extracted.

However, words which appear many times in the document include those (like "the" and "and", for example) which are common and are not suitable for the sorting attribute. On the contrary, it is often found that words which do not appear many times are important. This is often seen, particularly in technical fields. According to this conventional technique, therefore, the sorting attribute of keywords or derivatives cannot be correctly extracted.

d) Method of using the sorting attribute which remains after sorting and removing unnecessary sorting attributes from the document.

According to this method, a list of unnecessary sorting attributes (or a dictionary of unnecessary words, for example) made by the user is cited, and the unnecessary sorting attributes (or unnecessary words, for example) are removed from the sorting attribute selection (or keyword selection, for example).

This conventional technique, however, has the following disadvantages:

i. It depends upon the user's intuition whether or not a sorting attribute is needed as the intended sorting attribute. Many pieces of information which do not meet the user's retrieval intention, therefore, may be included in the results of those extracted intended sorting attributes.

ii. Many common sorting attributes are included in those which are deemed as being unnecessary. Too many attributes are therefore extracted which makes the processing efficiency low.

Conventional techniques of creating a thesaurus while storing character data on the basis of results extracted of keywords or derivatives, and their disadvantages, are as follows:

A) Method of analyzing the meanings of keywords or derivatives extracted by the natural language processing technique to find the relationship between this one and the others.

However, the natural language processing technique is still developing and is not yet practical. In addition, it needs a large volume of a dictionary. In order to create a dictionary or thesaurus, therefore, another dictionary is required.

B) Method of statistically processing keywords or derivatives extracted to find the relationship between this one and the others.

This method is based on the assumption that keywords appearing in a same sentence have a relationship.

However, the keywords appearing in the same sentence include many that are not related to each another in the meaning of a synonym. In addition, many keywords appearing in different sentences can be related to one another. As is apparent from the above, the method of carrying out only a statistical process to find synonyms and related words has limitations.

SUMMARY OF THE INVENTION

The present invention has the above-described background and is therefore intended to create a suitable thesaurus by automatically extracting suitable keywords or derivatives and by sorting character data on the basis of results extracted from them without using any dictionary.

A first aspect of the present invention includes a "derivatives representing character string candidate creating section," for creating derivatives representing character string candidates, which are used to sort character data, from a set of samples of character data which can be expressed sequentially; and a sorting tree creating section for selecting a derivatives representing character string from the created derivatives representing character string candidates on the basis of results obtained by evaluating the sorting attribute of whether or not each sample of character data includes the created derivatives representing character string, or its derivatives as a partial character string, and labeling it in an internal node, and successively sorting the samples of character data on the basis of results obtained by evaluating the sorting attribute of whether or not each sample of character data includes the selected derivatives representing character string or its derivatives as a partial character string, to thereby create a "data sorting binary tree" in which the derivatives representing character string is labeled in the internal node.

Further, the first aspect of the present invention provides "a data sorting unit" for sorting input character data on the basis of a data sorting tree created, and a "thesaurus creating unit." This thesaurus creating unit includes a thesaurus creating section for creating a thesaurus of samples of desired character data as linked characters of the derivatives representing character string, or those of negative words of the derivatives representing character string which is labeled in each internal node present on a path extending from a root node of the data sorting tree to a leaf node thereof, to which a sorting class of samples of desired character data is labeled.

The above-described first aspect of the present invention can provide the following merits:

The character data sorting process does not depend upon whether or not the quality of grammatical composition, for example, is known. The process of using the quality of character data is thus made unnecessary which thereby makes the system lighter in weight.

Further, the character data sorting process does not use the quality of character data. Therefore, it does not depend upon the quality of input character data which thereby makes the system more flexible Furthermore, the data sorting tree, which is an expression of sorting rules, creates the meanings of the data. Even when the grammatical compositions or meanings of data are unknown, therefore, the thesaurus of the data can be automatically created.

Still further, the recursive method is used to extract the derivatives representing character string. As the amount of data added becomes greater, the derivative representing character string extracted can be made more and more suitable.

According to the first aspect of the present invention, therefore, the retrieval of character data can be achieved with a higher efficiency and samples of new and unknown character data can be more suitably sorted by the data sorting tree gained as learning results or according to the learning results obtained up to that time.

A second aspect of the present invention includes a "keyword candidates creating section" for creating keyword candidates which are used to sort character data from a set of samples of character data which can be sequentially expressed; a "selected word creating section" for creating a selected word of the keyword candidates created as a sum of the keyword candidates; and a "data sorting tree creating section" for selecting a selected word from the created keyword candidates on the basis of results obtained by evaluating the sorting attribute of whether or not each sample of character data matches at least one keyword candidate which is the selected word of the created keyword candidates, and labeling it in an internal node, and successively sorting the samples of character data on the basis of the results obtained by evaluating the sorting attribute of whether or not each sample of character data matches at least one keyword which is the selected word of the selected keywords to thereby create a data sorting binary tree in which the selected word of the keywords is labeled in the internal node.

Further, the second aspect of the present invention provides a "data sorting unit" for sorting input character data according to the data sorting tree created, and a "thesaurus creating unit." The thesaurus creating unit includes a thesaurus creator section for creating a keyword group, which comprises the selected word, as a thesaurus, and every selected word of keywords which is labeled in the root or internal node on the data sorting tree.

The above-described second aspect of the present invention can provide the following merits:

The selected word of keywords is labeled in the root or internal node on the data sorting tree. This enables related words to be appropriately grouped on the created data sorting tree, thereby increasing the efficiency of the data sorting process.

Further, the keyword group which comprises the selected word can be more easily created as a thesaurus, as every selected word of keywords which is labeled in the root or internal node on the data sorting tree.

BRIEF DESCRIPTION OF THE DRAWINGS

FIG. 5 shows an example (or part) of the samples inputted;

FIG. 6 shows a list of sorting items for the samples inputted;

FIG. 7 shows an example of derivatives representing character string candidates created;

FIG. 11 shows a part of samples sorted in the fifth of the sorting items;

FIG. 16 shows a part of related words extracted from the data sorting tree which is learned in the second embodiment of the present invention.

DESCRIPTION OF THE PREFERRED EMBODIMENTS

Explanation of the Principle

Figure 1:
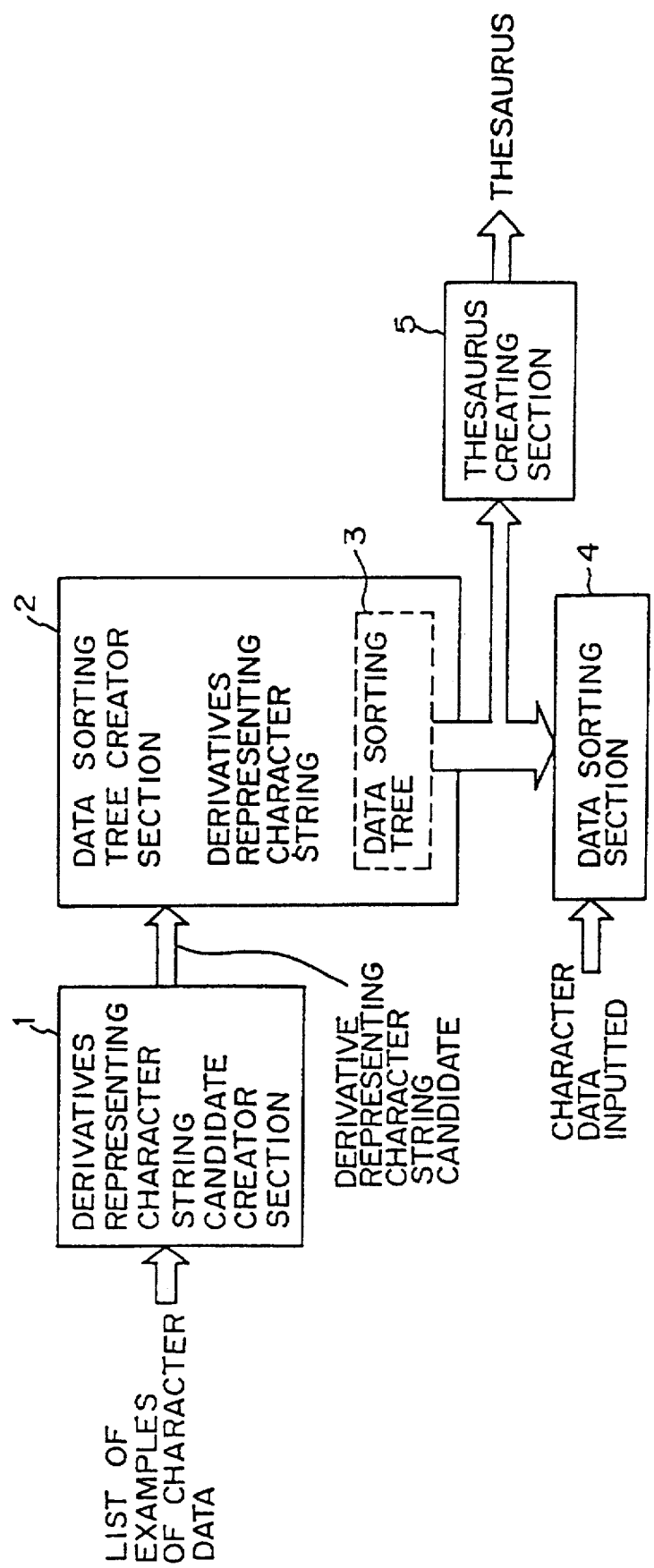
FIG. 1 is a block diagram showing a first embodiment of the present invention.

FIG. 1 is a block diagram showing a first aspect of the present invention.

A derivatives representing character string candidate creator section 1 is intended to create derivatives representing character string candidates, which are used to sort character data from a set of samples of character data which can be sequentially expressed.

The section 1 creates all partial character strings, each having a number of characters within a desired range, as derivatives representing character string candidates, from a set of samples of character data, for example.

A data sorting tree creator section 2 in FIG. 1 selects a derivatives representing character string from the derivatives representing character string candidates created on the basis of results obtained by evaluating the sorting attribute of whether or not each sample of character data includes the created derivatives representing character string candidates or its derivatives as a partial character string and labels it in an internal node. At the same time, the section 2 successively sorts each sample of character data on the basis of the results obtained by evaluating the sorting attribute of whether or not each sample of character data includes the selected derivatives representing character string or its derivatives as a partial character string. As the result, the section 2 creates a data sorting binary tree 3, in which derivatives representing character strings are labeled in the internal nodes.

The data sorting tree creator section 2 includes a section for changing the end of derivatives representing character string candidates, or derivatives representing character strings, according to a predetermined rule, and a section for extracting character strings, which are obtained by the change section, as derivatives of the derivatives representing character string candidates or derivatives representing character strings.

Further, the above-described data sorting tree creator section 2 creates the data sorting tree 3 while carrying out the following processes a)–f):

a) Confirming whether or not the rate at which labels attached to samples of character data are not the same is smaller than a predetermined threshold value in a set of samples of input character data, or whether or not the number of samples in the set of samples of input character data is smaller than a predetermined threshold value.

b) Outputting the same label, which is appearing the most in the set of samples of input character data, as one leaf node of the data sorting tree 3, and stopping the process, when the condition a) is satisfied.

c) Selecting, as a derivatives representing character string, that one of the created derivatives representing character string candidates which has the best result from predetermined evaluations, including the evaluation of the sorting attribute of whether or not each sample of input character data includes the created derivatives representing character string candidates or its derivatives as a partial character string, and which is the longest, when the condition a) is not satisfied.

d) Successively sorting the samples of character data on the basis of results obtained by evaluating the sorting attribute of whether or not each sample of character data includes, as a partial character string, the derivatives representing character string candidates or its derivatives selected by the process c).

e) Applying the processes a)–d) recursively and repeatedly to each set of the samples of character data sorted by the process d).

f) Setting, as a label in an internal node, the derivatives representing character string selected by the process c) at the time when the process e) is stopped, outputting labels or label groups which are the results obtained by the process e) and which are set as such on parts of the tree connected to the internal node, and stopping the process.

A data sorting section 4 in FIG. 1 is intended to carry out branching operations along the data sorting tree 3 on the basis of results obtained by evaluating the sorting attribute of whether or not input character data includes the derivatives representing character string or its derivative, which has been labeled in the internal node, in each internal node on the data sorting tree 3, and to sort the input character data into sorting classes labeled from the root node to a last leaf node on the data sorting tree 3.

A thesaurus creator section 5 in FIG. 1 is intended to create a thesaurus of samples of desired character data as linked words of the derivatives representing character strings or those of negative words thereof labeled to internal nodes present on a path extending from the root node to the leaf node on the data sorting tree 3 to which the sorting class is labeled, the samples of desired character data belonging to the sorting class.

It will be described how the first aspect of the present invention having the above-described arrangement functions.

The derivatives representing character string candidate creator section 1 creates derivatives representing character string candidates from sets of samples of character data which are to be learned. The "no meaning" process, for example, relating to the characteristic quality of data is carried out in this case. All of the partial character strings, each having a predetermined number of characters within a range, can be created as derivatives representing character string candidates, from samples of character data.

The data sorting tree creator section 2 can label a suitable derivatives representing character string to an internal node, when the evaluation of the sorting attribute relating to the derivatives representing character string candidates is applied to the samples of character data. In addition, it can sort the samples of character data successively and create the data sorting tree 3 when the evaluation of the sorting attribute relating to the derivatives representing character string is applied to the sample of character data. In the evaluation of the sorting attribute relating to the derivatives representing character string (or candidate), it is evaluated whether or not the derivatives representing character string (or candidate) and its derivative are included as a partial character string in the samples of character data. According to the present invention, this derivative can be formally decided without checking its meaning or similar. when the end of the derivatives representing character string (or candidate) is changed or deformed according to a predetermined rule. Further, the data sorting tree creator section 2 can automatically create the data sorting tree 3 while carrying out the above-mentioned processes a)–f) through a computer.

When the data sorting tree 3 is created in the above-described manner, derivatives representing character strings can be extracted without using the meaning process and without grammatical knowledge.

The data sorting section 4 can sort a sample of input new and unknown character data into a sorting class labeled to a leaf node finally arrived at while tracing the path from the root node on the created data sorting tree 3.

The thesaurus creator section 5 can automatically create a thesaurus of samples of desired character data as linked words of the derivatives representing character strings or those of negative words thereof, labeled to the internal nodes present on the path which the character data traces on the data sorting tree 3.

Figure 2:
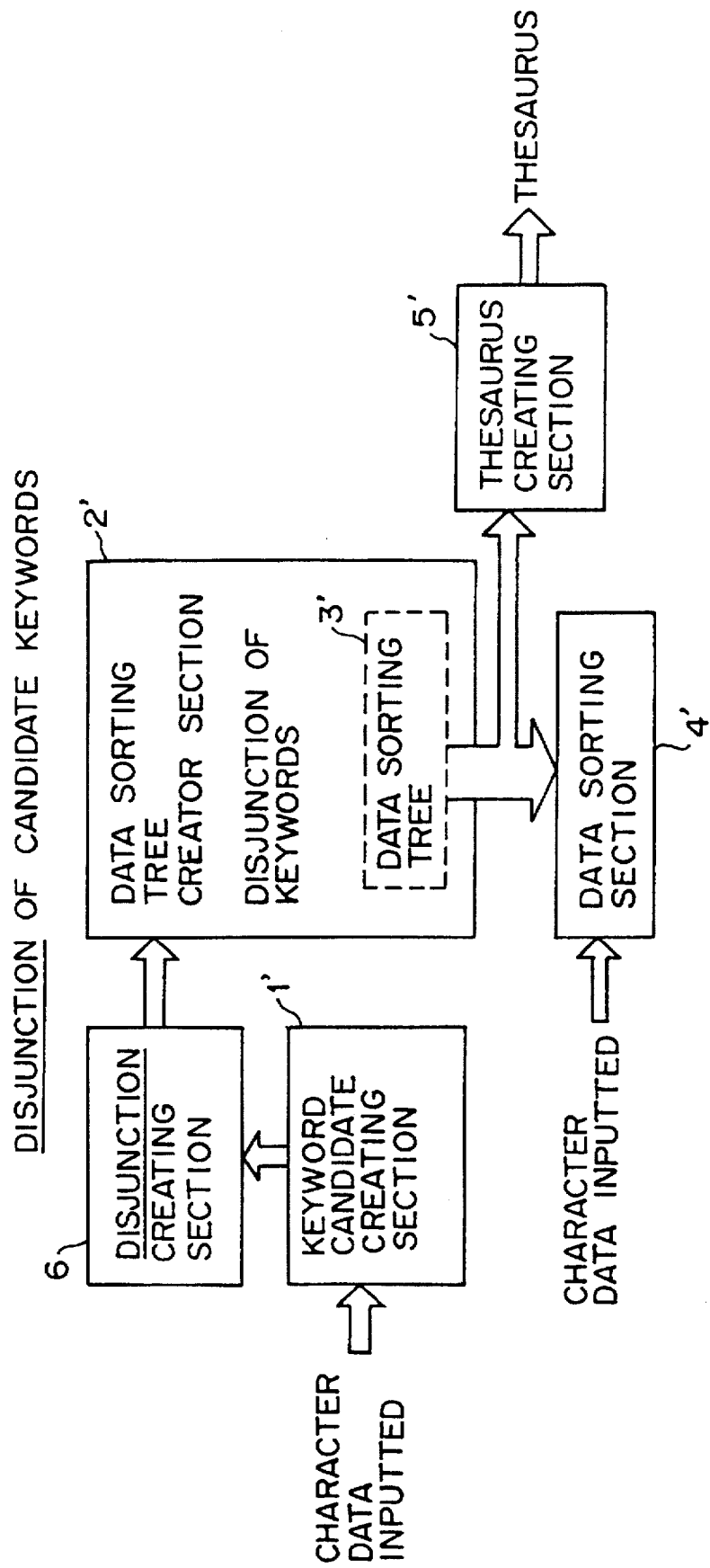
FIG. 2 is a block diagram showing a second embodiment of the present invention.

FIG. 2 is a block diagram showing a second aspect of the present invention.

A keyword candidate creator section 1' in FIG. 2 is intended to create keyword candidates, which are used to sort character data, from a set of samples of character data which can be sequentially expressed. Derivatives representing character strings are included in the keywords.

A selected word creator section 6 in FIG. 2 is intended to create the selected word of the created keyword candidates or that of the keyword candidates which is a logical sum of the keyword candidates.

The keyword candidate creator section 1' creates all of the partial character strings, each having a predetermined number of characters in a range, as keyword candidates, from a set of samples of character data, for example.

A data sorting tree creator section 2' in FIG. 2 selects a selected word of the keywords from those of the keyword candidates created on the basis of results obtained by evaluating the sorting attribute of whether or not each sample of character data matches at least one keyword candidate which comprises the selected words of the created keyword candidates, and labels it to an internal node. At the same time, the section 2' successively sorts each sample of character data on the basis of results obtained by evaluating the sorting attribute of whether or not each sample of character data matches at least one keyword which comprises the selected words of the keywords selected. As the result, the section 2' creates a data sorting binary tree 3' to internal nodes of which the selected words of the keywords are labeled.

The data sorting tree creator section 2 creates the data sorting tree 3' while carrying out the following processes a)'–f)':

a)° Confirming whether or not the rate at which labels attached to samples of character data are not the same is smaller than a predetermined threshold value in a set of samples of input character data, or whether or not the number of samples in the set of samples of input character data is smaller than a predetermined threshold value.

b)' Outputting the same label, which is appearing the most in the set of samples of input character data, as one leaf node of the data sorting tree 3', and stopping the process, when the condition a)' is satisfied.

c)' Selecting, as a selected word of the keywords, that one of the keywords which has the best result from predetermined evaluations, including that of the sorting attribute of whether or not each sample of input character data matches at least one keyword candidate which comprises selected words of the created keyword candidates, and which is the longest, when the condition a)' is not satisfied.

d)' Successively sorting the samples of character data on the basis of results obtained by evaluating the sorting attribute of whether or not each sample of character data matches at least one keyword which comprises selected words of the keywords selected by the process c)'.

e) Applying the processes a)'–d)' recursively and repeatedly to each set of the samples of character data sorted by the process d)'.

f) Setting, as a label to an internal node, the selected word of the keywords selected by the process c)' at the time when the process e)' is stopped, outputting labels or label groups which are the results obtained by the process e)' and which are set as such on parts of the tree connected to the internal node, and stopping the process.

A data sorting section 4' in FIG. 2 is intended to carry out branching operations along the data sorting tree 3' on the basis of results obtained by evaluating the sorting attribute of whether or not input character data matches at least one keyword, which has been labeled in the internal node and which comprises selected words of the keywords, in each internal node on the data sorting tree 3', and to sort the input character data into sorting classes labeled from the root node to a last leaf node on the data sorting tree 3'.

A thesaurus creator section 5' in FIG. 2 is intended to create a thesaurus with keyword groups, every selected word labeled to the root or internal node on the data sorting tree 3', said keyword groups comprising the selected words.

What is the meaning of "whether or not a certain character data matches the keyword (or keyword candidate)"? It means here that whether or not the certain character data includes the keyword as a partial character string when the keyword (or keyword candidate) is a common character string, and that whether or not the certain character data includes the keyword or its derivative as a partial character string when the keyword is a derivatives representing character string (or derivatives representing character string candidate), for example.

It will be described how the second aspect of the present invention having the above-described arrangement functions.

The keyword candidate creator section 1' creates keyword candidates from sets of samples of character data which are to be learned. The "no meaning" process, for example, relating to the characteristic quality of data is carried out in this case, as seen in the first aspect of the present invention. All of the partial character strings, each having a predetermined number of characters in a range, can be created as keyword candidates, from sets of samples of character data, for example.

The selected word creator section 6 in FIG. 2 is intended to create a selected word of the keyword candidates as a logical sum thereof.

The data sorting tree creator section 2' can label a suitable selected word of keywords to an internal node, when the evaluation of the sorting attribute relating to the selected word of keyword candidates is applied to each sample of character data. In addition, it can sort the samples of character data successively and create the data sorting tree 3' when the evaluation of the sorting attribute relating to the selected word of keywords is applied to the sample of character data. When this selected word of keywords is labeled to the root or internal node on the data sorting tree 3', related words themselves can be suitably grouped on the data sorting tree 3', thereby greatly increasing the capacity of the data sorting process. Further, the data sorting tree creator section 2' can automatically create the data sorting tree 3' while carrying out the above-mentioned processes a)'–f)' through a computer, as seen in the case of the first aspect of the present invention.

When the data sorting tree 3' is created in the above-described manner, the selected word of keywords can be extracted without using the meaning process and without grammatical knowledge.

The data sorting section 4', same as that in FIG. 1, can sort a sample of in put new and unknown character data into a sorting class labeled to a leaf node finally arrived at while tracing the path from the root node on the created data sorting tree 3'.

The thesaurus creator section 5' can more easily create a thesaurus with keyword groups, every selected word of keyword labeled to the root or internal node on the data sorting tree 3', said keyword groups comprising these selected words.

First Preferred Embodiment

A data sorting method using a decision tree, which is essential to the first preferred embodiment of the present invention, will be described (the decision tree will be hereinafter referred to as data sorting tree).

As shown in FIG. 1, the data sorting tree is a binary one wherein a character string which represents derivatives (and which will be hereinafter referred to as derivatives representing character string) is labeled to each internal node (enclosed by a rectangle) and a sorting class for data to each leaf node (enclosed by an ellipse).

Figure 3:
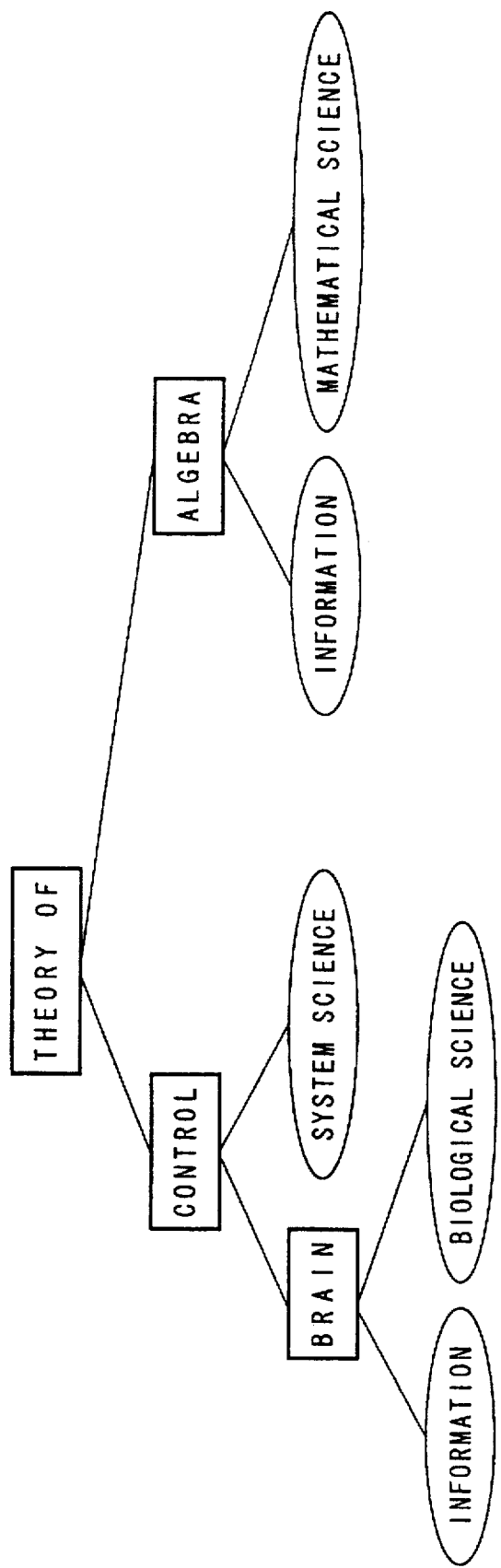
FIG. 3 shows an example of the data sorting tree in the first embodiment of the present invention.

In order to sort each sample and decide its sorting class by the data sorting tree, the following method is used:

In FIG. 3, a sample decides a unique path extending from a root node (or internal node to which "theory of" is labeled) to a leaf node on the data sorting tree. If the sample in the internal node includes a derivatives representing character string or its derivative, which is labeled to the node, as a partial character string (or if it includes a character string which is related to the same derivatives), it traces a right branch of the data sorting tree. To the contrary, it traces a left branch if it does not include the character string.

As the result obtained by the above process, a class name labeled to the leaf node at which the sample arrived is one to which the sample is to be sorted.

If the sample includes the label "theory of" as a partial character string, as shown in FIG. 3, for example, it traces the right branch extending from the internal node to which the label is attached. Further, if it includes a label "algebra" as the partial character string, it traces the right branch extending from the internal node to which this label is attached. As the result, "mathematical science" is a class to which it is to be sorted.

If the sample does not include the label "algebra" as the partial character string, it traces a left branch extending from the internal node to which the label is attached. As the result, "information" is a class to which it is to be sorted.

As described above, the data sorting tree shown in FIG. 3 serves as decision tree for processing the sorting attribute of whether or not the derivatives representing character string or its derivative is included in an inputted character string.

Figure 4:
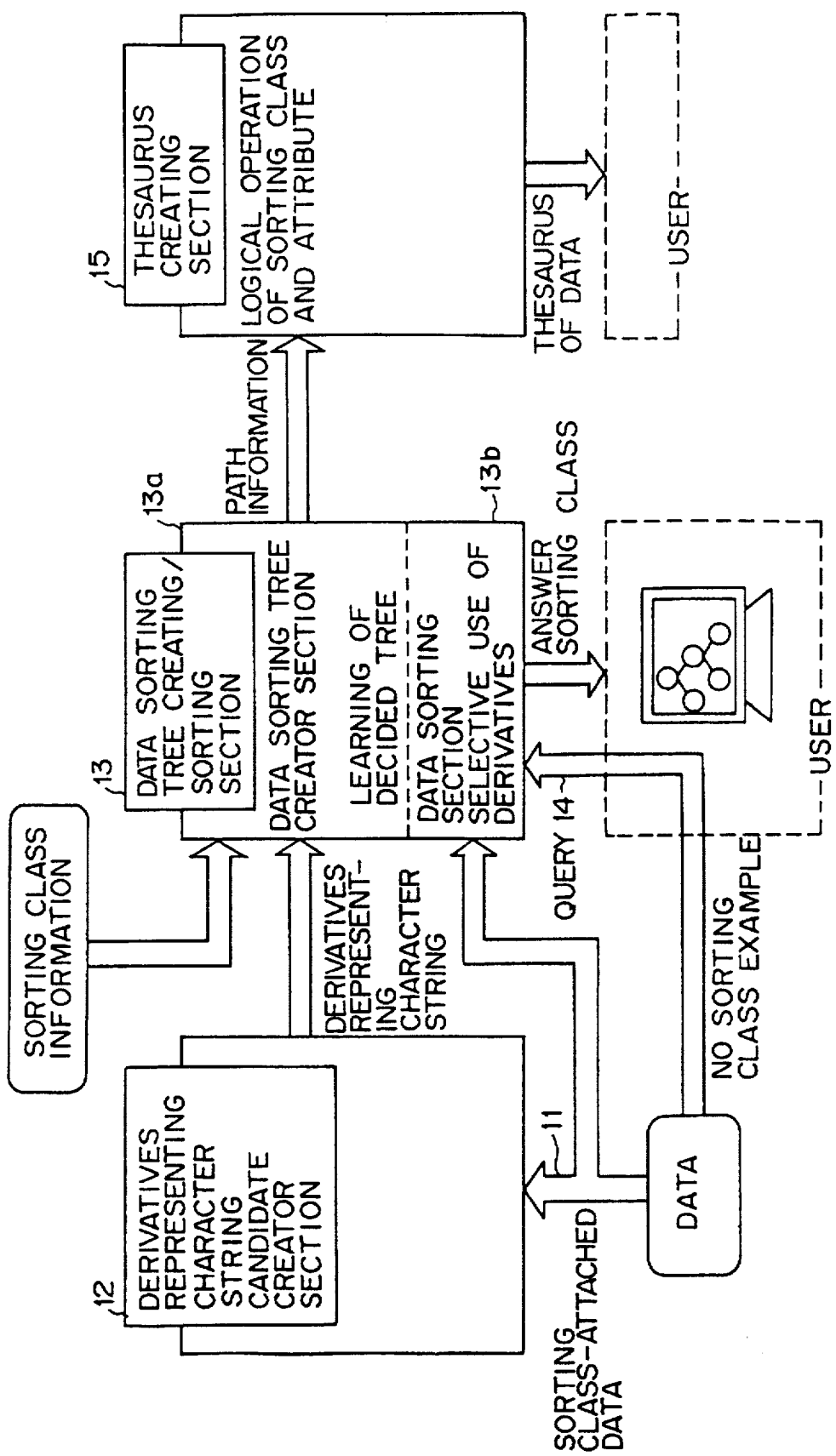
FIG. 4 shows the whole arrangement of a system according to the first embodiment of the present invention.

FIG. 4 shows the whole arrangement of a system according to the first embodiment of the present invention.

A data input section 11 enables the user to input samples and a collection of sets of their sorting classes through it.

When the input data is a book, for example, the title of the book and a set of its sorting items such as "Advanced Information System Engineering" and "System Science" are inputted through the data input section 11.

The set used above will hereinafter be referred to as "example" and the collection of sets as "sample".

A derivatives representing character string candidate creator section 12 creates derivatives representing character string candidates from examples of a sample. It creates all of the partial character strings, each having a length which is within an appointed range, as derivatives representing character string candidates. When this candidate creating method is used, the meaning process, for example, applied to check the characteristic quality of data, can be made unnecessary, and dictionaries to assist the meaning process and to parse parts of speech, can also be made unnecessary. This enables the system to be made lighter in weight and smaller in size.

A data sorting tree creating/sorting section 13 comprises a data sorting tree creator section 13a and a data sorting section 13b.

The data sorting tree creator section 13a learns the data sorting tree on the basis of an algorithm, which will be described later, while using a list of derivative representing character string candidates created by the derivatives representing character string candidate creator section 12.

The algorithm used by the data sorting tree creator section 13a is intended to create the data sorting tree according to a method proposed in the literature: Yasubumi Sakakibara's "Algorithmic Learning of Formal Language and Decision Tree", Research Report IIAS-RR-91-22E, IIAS-SIS, FUJITSU LABORATORIES LTD., 1991.

The above-mentioned algorithm has the following characteristics:

1) The sorting attribute processed by this algorithm is whether or not character strings included in a derivatives representing character string candidate list include their derivatives.

2) An entropy function disclosed in the following literature is used as evaluation function "Eval" to sort the sorting attributes: J. Ross Quinlan's "Induction of Decision Tree", Machine Learning 1(1), PP. 81–106, 1986.

3) This algorithm is very effective against noise (or more accurately, sorting noise) contained in data in the sample.

In the case of the algorithm, a sorting error which is caused at the data sorting time and which is called sorting noise, must be resolved. Therefore a cut value (which will be described later) corresponding to the rate of noise is inputted, and the sorting of data is controlled responsive to the cut value inputted.

The evaluation function Eval used in the algorithm is not limited to the one shown in the literature in the above item 2) but it may be other functions.

A query section 14 queries the data sorting section 13b about a new example which has not been used as training data for learning the data sorting tree by the data sorting tree creator section 13a. When it is queried by the query section 14, the data sorting section 13b sorts the queried new example along the data sorting tree and provides its sorting process and result to the user.

A thesaurus creator section 15 creates a thesaurus by extracting the relationship of the sorting class to the sorting attribute of whether or not a certain character string or its derivative is included, while using the data sorting tree learned by the data sorting tree creator section 13, and it proposes the thesaurus to the user.

In the case of the first preferred embodiment, the thesaurus of an example is expressed as a derivatives representing character string or a linked word of its negative word, labeled to an internal node present on a path extending from a root node on the data sorting tree to a leaf node thereon, to which the sorting class of the example is labeled. If the example traces the right branch extending from the internal node (or if it includes a character string which has the same derivative relationship as it) in this case, the derivatives representing character string labeled to the internal node is inserted into the linked word, but if it traces the left branch extending from the internal node (or if it does not include a character string which has the same derivative relationship as it), the negative word of the derivatives representing character string labeled to the internal node is inserted into the linked word.

The process of extracting the derivatives representing character string and the data sorting process on the basis of result obtained by the extracting process in the system, according to the first preferred embodiment having an arrangement shown in FIG. 4, will be described.

The examples used in the first preferred embodiment are data of the titles of 566 copies of foreign books stocked in a library and of their sorting items. FIG. 5 shows an example (or part) of samples inputted in the first preferred embodiment. Each example has a data format of "number of sorting item ! title". FIG. 6 shows a list of sorting items and their explanation as used in the library.

When each example of the samples shown in FIG. 5 is inputted into the derivatives representing character string candidate creator section 12 through the input section 11, the section 12 outputs, as a derivatives representing character string candidate, a partial character string which is included in the title of the example inputted, and which has a number of characters within a predetermined range.

FIG. 7 shows an example of derivatives representing character string candidates which are created by the section 12, and which correspond to each example of the samples shown in FIG. 5. In the case of the first preferred embodiment, each partial character string which has a number of characters larger than 4 characters, but smaller than 30 characters, is outputted as a derivatives representing character string candidate in the first preferred embodiment.

As is apparent from the above, derivatives representing character string candidates can be created without using grammatical knowledge.

The data sorting tree creator section 13a learns the data sorting tree as follows, while using a list of derivatives representing character string candidates created by the section 12.

A method of not specifically but generally defining the derivative relationship used by the learning algorithm of the data sorting tree will be described.

When it is to be defined that character strings u, v are derivatives, the derivatives are defined not by referring to dictionaries, but on the basis of the matching of their character strings as follows:

a) When len(min(u,v))<4 or the length of the shorter character string is smaller than 4 characters, the character strings u, v are derivatives, providing that u=v. Min(u,v) represents the shorter one of the character strings u, v and max(u,v) the longer one of them. Further, len(min(u,v)) denotes the number of characters of the character string min(u,v).

b) When len(min(u,v))=4 or the length of the shorter character string is equal to 4 characters, the character strings u, v are derivatives, providing that the following formula (1) is established:

$$\exists t \in \{\epsilon\} \cup \Sigma \cup \Sigma^2 [min(u, v)t=max(u,v)] \quad (1)$$

wherein $\epsilon$ represents a character having a length of 0 (which means that no character is present), $\Sigma$ a collection of optional characters having a length of 1, $\Sigma^2$ a collection of optional character strings having a length of 2, $\Sigma^3$ a collection of optional character strings having a length of 3 and $\Sigma^*$ a collection of character strings having an optional length. When each of the character strings u, v has a length of 4 characters, or the shorter one of the character strings u, v, which has the length of 4 characters and which comes to have a length of 5 or 6 characters as the result of adding an optional character string t of 1 or 2 characters to its end, is equal to the other character string in character number, therefore they are derivatives of each other.

c) When len(min(u,v))>4, that is, when the shorter one of the character strings u, v has a length longer than 4 characters, they are derivatives of each other, providing that a relationship expressed by the following formula (3) is established relative to a character string s' which has a relationship expressed by the following equation (2):

$$s=min(u,v), \; s=s'a(a \in \Sigma) \quad (2)$$

$$\exists t \in \Sigma \cup \Sigma^2 \cup \Sigma^3 [s't=max(u,v)] \quad (3)$$

When the character string s', which is obtained by removing an optional character string a of length 1 from the end of the shorter one ls=en(min(u,v)) of the character strings u, v, is equal to the other, or when a character string which is obtained by adding an optional character string of length 1, 2 or 3 to the end of the character string t, is equal to the other, therefore the character strings u, v are derivatives of each other.

According to the above-described derivative definition, "book" and "books" are derivatives of each other and "study" and "studies" are also derivatives of each other.

When this formal derivative definition is used, suitable derivatives can be automatically extracted in the course of learning the data sorting tree.

The sorting binary attribute which is used in the learning algorithm of the data sorting tree is defined as follows:

When the sorting attribute relating to the character string v is denoted by $K_v$, the sorting attribute $K_v$ is predicate to having an argument expressed by the element of a collection $\Sigma^*$ of character strings of optional length. In short, $K_v$ (u) has the following meaning when the sorting attribute of the character string v relative to the character string u which is included in the collection $\Sigma^*$ is expressed by $K_v(u)$:

$K_v$ (u) is true ←→ "the character string u includes, as a partial character string, the character string v or a character string which is in the derivative relationship to the character string v".

For example, the sorting attribute $K_v$ (u) of the character string v="Information System" relative to the character string u="Advanced Information System Engineering" becomes true.

Figure 8:
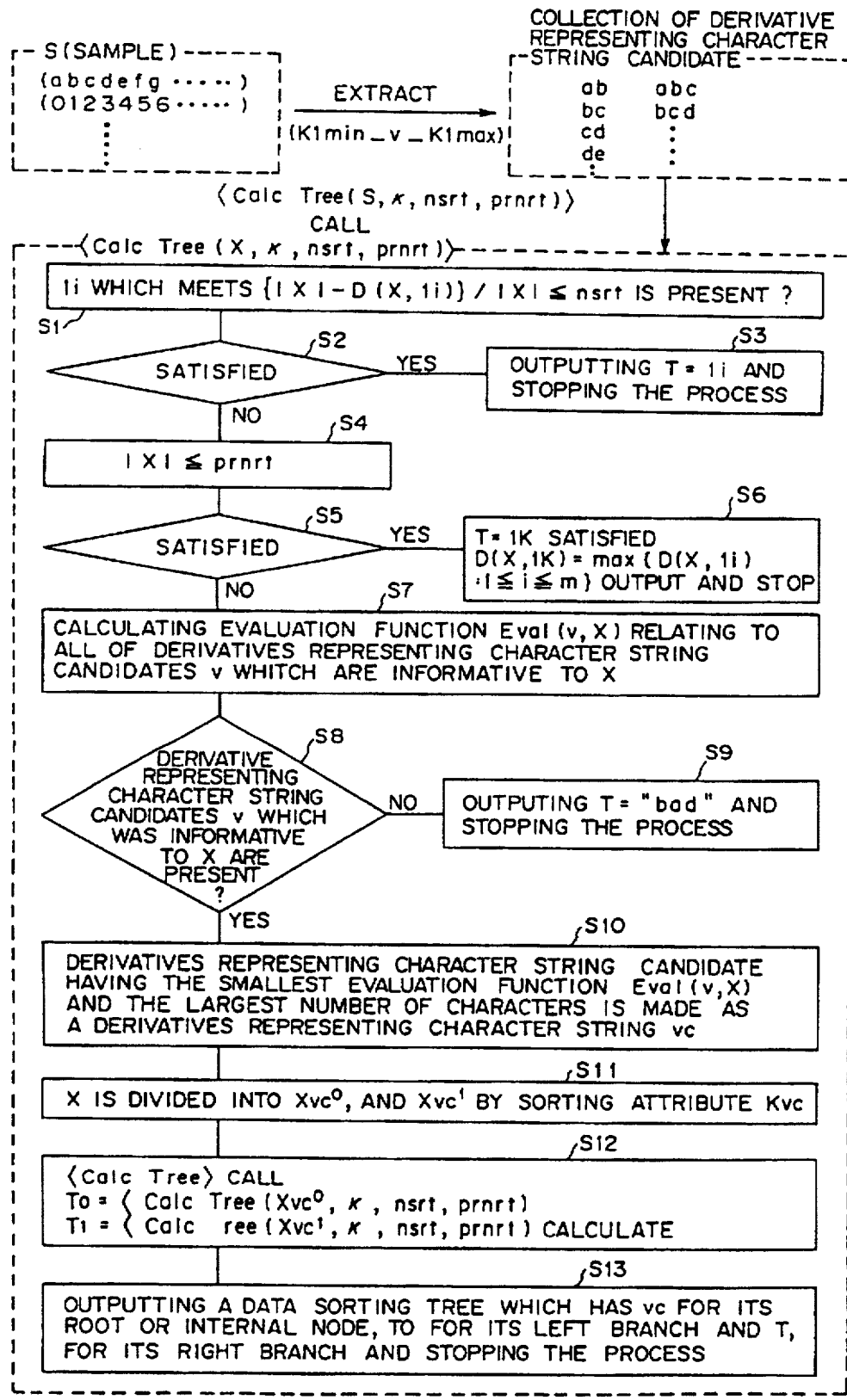
FIG. 8 is a flow chart showing a learning algorithm in the first embodiment of the present invention.

The data sorting tree creator section 13a in FIG. 4 selects a derivatives representing character string from derivatives representing charter string candidates created by the derivatives representing character string candidate creator section 12, as follows, according to the above-described derivative and sorting attribute definitions as follows:

FIG. 8 is an operation flow chart showing a learning algorithm in the first preferred embodiment of the present invention.

The following expressions are used in the operation flow chart shown in FIG. 8:

Example: means a pair (w, 1). w denotes a character string and 1 a label of the sorting classes. In FIG. 5, title corresponds to the character string w and the number of sorting items to the label 1 of the sorting classes.

Sample: denoted by S. This is a limited collection of examples.

Symbols $X_v^1$, $X_v^0$ and $D(X, c)$ are defined by the following equations (4), (5) and (6):

$$X_v^1 = \{(w,l) \in X | K_v(w) \text{ is true}\} \quad (4)$$

$$X_v^0 = \{(w,l) \in X | K_v(w) \text{ is false}\} \quad (5)$$

$$D(X,c) = \{(w,l) \in X | l = c\} \quad (6)$$

A collection of examples (w, 1) included in a sample X in which the sorting attribute $K_v$ of the character string v is true, is defined by $X_v^1$, and a collection of the sample X in which the sorting attribute $K_v$ (w) is false, by $X_v^0$. In other words, a collection of examples (w, 1) in the sample X which includes, as a partial character string, the character string v or one having derivative relation to the character string v, is defined by $X_v^1$, and a collection of examples (w, 1) in the sample X which does not include, as a partial character string, the character string v or one having derivative relation to the character string v, by $X_v^0$. Further, the number of those examples (w, 1) in the sample X in which the label 1 of their sorting classes is equal to a label c, is defined by D (X, c)

Furthermore, the evaluation function Eval(v, X) used in the operation flow chart in FIG. 8, is defined by the following equation (7):

$$I(X) = -\sum_{j=1}^{m} \frac{|D(X, l_j)|}{|X|} \log_2 \frac{|D(X, l_j)|}{|X|} \quad (7)$$

$$Eval(v, X) = \frac{|X_v^0|}{|X|} I(X_v^0) + \frac{|X_v^1|}{|X|} I(X_v^1)$$

wherein m represents the number of sorting classes, $1_1$, $1_2$, .... $1_m$ the label of each of sorting classes, and |X|, $|X_v^1|$, ... $|X_v^0|$ the number of examples belonging to each of collections X, $X_v^1$, $X_v^0$.

The process shown in the operation flow chart in FIG. 8 will be described successively.

The derivatives representing character string candidate creator section 12 extracts a derivatives representing character string candidate v from a sample S inputted through the data input section 11 by the user. In this case, it extracts a collection k of derivatives representing character string candidates v, as shown in the following equation (8), by using parameters $K1_{min}$ and $K1_{max}$ ($K1_{min}$=4 and $K1_{max}$ in the first preferred embodiment) relating to the length of character strings inputted at the same time:

$$\kappa = \{v : kl_{min} \leq \text{number of characters in } v \leq kl_{max}$$

where v indicates a partial character string for $$u((u,l) \in S)\} \quad (8)$$

Namely, the collection k of partial character strings which are one of the character strings w (which corresponds to the titles listed in FIG. 5) of examples (w, 1) included in the sample S inputted, and whose character number is larger than $K1_{min}$ but smaller than $K1_{max}$ (larger than 4 characters but smaller than 30 characters in the first preferred embodiment) is extracted as a list of derivatives representing character string candidates.

The collection k of derivatives representing character string candidates is thus extracted like ab, bc, cd, ... shown in FIGS. 7 and 8.

As described above, the derivatives representing character string candidate creator section 12 can create all of the partial character strings, each having an appointed or predetermined length as candidates of derivatives representing character strings of keywords, without requiring any grammatical knowledge. This makes it unnecessary to use any special dictionary or other reference data.

The data sorting tree creator section 13a creates a data sorting tree T from the results obtained when the following steps S1–S11 are carried out as a sub-calculation CalcTree (S,k,nsrt,prnrt). The sample S is replaced by a sample X in the description made below.

The sub-calculation CalcTree is a process by which a collection of examples, which includes derivatives representing character strings selected as will be described later, or those which are in derivative relationship to the selected ones, is sorted from a collection of examples which does not include. A set of two-divided trees connected to an internal node (enclosed by a rectangle as shown in FIG. 3), to which a derivatives representing character string is labeled, are thus created. In the sub-calculation CalcTree in this case, two sub-calculations CalcTree having inputs which are two divided collections are recursively called up, and two further sub-calculations CalcTree are recursively called up in each of the firstly called up two sub-calculations CalcTree. As the result, branches of the data sorting tree extend further and further to the leaf nodes (each enclosed by an ellipse as shown in FIG. 3). When the recursively called up lower sub-calculations CalcTree are successively completed and the firstly called up ones are also completed, the data sorting tree which corresponds to the first input sample X=S is then complete.

A series of steps S1–S6 in the sub-calculation CalcTree are a process to stop the collection of examples, which belong to the input sample X, from being further sorted.

Firstly in the step S1, the data sorting tree creator section 13a checks whether or not label T=li which matches the following formula is present:

$$\frac{|X| - |D(X, l_i)|}{|X|} \leq nsrt \quad (9)$$

wherein, as apparent from equation (6), D(X, li) represents the number of examples in which the label 1(which corresponds to the number of sorting items in FIG. 5) attached to the examples (w, 1), is equal to a label li. It is therefore checked in the step Si whether or not the rate of the number of examples except those having the same label li as the one for their sorting classes, becomes smaller than a predetermined rate nsrt when the sample X is inputted. In other words, whether or not most of examples belonging to the input sample X have the common label li, is checked. The rate nsrt is called sorting noise, and nsrt=0.2 in the first preferred embodiment.

When the condition of step S1 is satisfied and the answer of step S2 is YES, therefore, the data sorting tree creator section 13a stops further sorting of the collection of examples which belong to the input sample X, that is, it stops further extending ranches of the data sorting tree, outputs T=li as a calculation result of the sub-calculation CalcTree, and stops this sub-calculation in the step S3. This value T=li becomes a sorting class name labeled to a leaf node (enclosed by an ellipse as shown in FIG. 3).

When the condition of step S1 is not satisfied and the answer of step S2 is NO, the data sorting tree creator section 13a checks in the step S4 whether or not the number of input samples X becomes smaller than a predetermined value prnrt. In other words, it checks whether or not the number of samples X sorted to a branch becomes a minimum The predetermined value prnrt is called a branch cut value, and prnrt=5 in the first preferred embodiment.

When the condition of step S4 is satisfied and the answer of step S5 is YES, therefore, the data sorting tree creator section 13a stops further sorting of the collection of examples which belong to the input samples X, or further extending branches of the data sorting tree, and it outputs, as the calculation result T of the sub- calculating CalcTree, a label 1k which matches the following equation (10), or in which the number of examples having the same label for their sorting classes becomes a maximum, and stops the sub-calculation:

$$lD(X, l_k) = \max\{lD(X, l_i) : 1 \leq i \leq m\} \quad (10)$$

The value T=1k becomes a sorting class labeled to a leaf node (enclosed by an ellipse as shown in FIG. 3), the same as in the step S3.

When conditions of steps S2 and S5 are not satisfied and the answer of step S5 is NO, or when it is decided that the collection of examples belonging to the input sample X must be sorted further (or branches of the data sorting tree must be extended further), the data sorting tree creator section 13a carries out a series of steps S7–S13.

Firstly in the step S7, the data sorting tree creator section 13a calculates the evaluation function Eval (v, X) defined by the equation (7), for all of derivatives representing character string candidates v which are informative to the input sample X. "The derivatives representing character string candidates v which are informative to the input sample X", represents those in which a collection $X_v^1$ is not empty and a collection $X_v^0$ that is also not empty, when the collection of examples (w, 1) belonging to the input sample X is sorted into the one $X_v^1$ (equation (4)), whose sorting attribute $K_v(w)$ is true, and the other $X_v^0$ (equation (5)), whose sorting attribute $K_v(w)$ is false. It is also needed in the calculation of the evaluation function Eval(v, X), that the collection of examples belonging to the input sample X is divided into the one $X_v^1$ whose sorting attribute $K_v$ is true about the derivatives representing character string candidates v, and the other $X_v^0$ whose sorting attribute $K_v$ is false (see equation (7)). This dividing process is carried out as in cases 1–5 (below), which describe a step S11 in more detail.

Then in the step S8, the data sorting tree creator section 13a decides whether or not the derivatives representing character string candidates v, which are informative to the sample X, are present in the step S7.

When no candidate v is present and the answer of step S8 is NO, the data sorting tree creator section 13a outputs an error "bad", as the calculation result T of the sub-calculation CalcTree in the step S9. In this case the result is that no suitable data sorting tree T is created.

When the candidates v are present and the answer of step S8 is YES, the data sorting tree creator section 13a selects, as a derivatives representing character string vc, the derivatives representing character string candidate v in which the value of evaluation function Eval(v, X), calculated in the step S7, is a minimum and whose character string length is a maximum.

Then in the step S11, the data sorting tree (etc, etc) section 13a removes the derivatives representing character string vc from the collection k of derivatives representing character string candidates v, and divides the collection of examples belonging to the input sample X in the currently processing sub-calculation CalcTree, into one $X_{vc}^1$, whose sorting attribute $K_{vc}$ is true about the derivatives representing character string vc, and the other $X_{vc}^0$ whose sorting attribute $K_{vc}$ is false therefor. In the step S11, therefore, the collection of examples belonging to the sample X is sorted into the one $X_{vc}^1$ which includes, as a partial character string, the derivatives representing character string vc or a character string which is in the derivative relationship to the character string vc, and into the other $X_{vc}^0$ which does not include, as a partial character string, the derivatives representing character string vc or a character string which is in the derivative relationship to the character string vc.

The step S11 will be carried out in the form of cases 1–5, based on the above-described formal derivative definitions.

Case 1: When the length of the derivatives representing character string vc is shorter than 4 characters, the collection of examples belonging to the input sample X is sorted on the basis of the above-described derivative definition (a), into the one $X_{vc}^1$, which includes the derivatives representing character string vc itself as a partial character string, and the other $X_{vc}^0$.

Case 2: When the length of the derivatives representing character string vc is equal to 4 characters, the collection of examples belonging to the input sample X is sorted on the basis of the above-described formal derivative definitions (b) and (a) into the one $X_{vc}^1$ which includes, as a partial character string, the derivatives representing character string vc or a character string obtained by adding 1 or 2 characters to the end of the character string vc, and the other $X_{vc}^0$.

Case 3: When the length of the derivatives representing character string vc is equal to 5 characters, the collection of examples belonging to the input sample X is sorted on the basis of the formal derivative definitions (c) and (b) into the one $X_{vc}^1$ which includes, as a partial character string, the derivatives representing character string vc or a character string obtained by removing 1 character from the end of the character string vc, or a character string obtained by removing 1 character from the end of the character string vc and adding an optional character string having a length of 1, 2 or 3 characters to the thus end-removed character string vc, and the other $X_{vc}^0$. Case 4: When the length of the derivatives representing character string vc is equal to 6 characters, the collection of examples belonging to the input sample X is sorted on the basis of the formal derivative definitions (c) and (b) into the one $X_{vc}^1$ which includes, as a partial character string, the derivatives representing character string vc, or a character string obtained by removing 1 character from the end of the character string vc and adding an optional character string having a length of 1, 2 or 3 characters to the character string vc from the end of which 1 character has been removed, or a character string obtained by removing 2 character s from the end of the character string vc, or a character string obtained by removing 2 character s from the end of the character string vc and adding an optional character string having a length of 1 character to the character string vc from the end of which 2 character s have been removed, and the other $X_{vc}^0$.

Case 5: When the length of the derivatives representing character string vc is longer than 7 characters, the collection of examples belonging to the input sample X is sorted on the basis of the formal derivative definition (c) into the one $X_{vc}^1$ which includes, as a partial character string, the derivatives representing character string vc, or a character string obtained by removing 3 character s from the end of the character string vc and adding an optional character string having a length of 1 character to the character string vc from the end of which 3 character s have been removed, or a character string obtained by removing 2 character s from the end of the character string vc and adding an optional character string having a length of 1 character to the character string vc from the end of which 2 character s have been removed, or a character string obtained by removing 1 character from the end of the character string vc, and the other $X_{vc}^0$.

As described above, the collection of examples belonging to the input sample X is sorted in the step S11 into the one $X_{vc}^1$ which includes, as a partial character string, the derivatives representing character string vc or a character string which is in the derivative relationship to the character string vc, and the other $X_{vc}^0$. A set of twice-divided trees connected to an internal node (which is enclosed by a rectangle as shown in FIG. 3) and to which one derivatives representing character string vc is labeled, are thus created.

Then in the step S12, the data sorting tree creator section 13a recursively calls two sub-calculations CalcTree ($X_{vc}^1$, k, nsrt, prnrt) and ($X_{vc}^0$, k, nsrt, prnrt) whose inputs are the above-mentioned collections $X_{vc}^1$ and $X_{vc}^0$ and processes them.

When the calculation results $T_0$ and $T_1$ obtained by the two sub-calculations CalcTree are determined, the section 13a outputs, in the step S13, a group of output labels T, in which the derivatives representing character string vc is set as a label of the root or leaf node, $T_0$ as labels (or group of labels) of the left branch connected to the root or leaf node, and $T_1$ as labels (or group of labels) of the right branch connected to the root or leaf node, and it then stops the sub-calculations.

The calculation results $T_0$ and $T_1$, obtained by the above-mentioned two sub-calculations CalcTree represent, in this case, labels of sorting classes labeled to the leaf node (enclosed by an ellipse as shown in FIG. 3), when these sub-calculations CalcTree are stopped by the steps S1 or S6. When the sub-calculations CalcTree are stopped by the step S13 after each of them has recursively called two further sub-calculations, the calculation results $T_0$ and $T_1$ represent a group of output labels which comprise the derivatives representing character string labeled to the root or leaf node (enclosed by an ellipse as shown in FIG. 3), labels (or group of labels) of the left branch connected to the root or leaf node, and labels (or group of labels) of the right branch connected to the root or leaf node.

When the lower sub-calculations CalcTree recursively called up are successively stopped and those firstly called up are finished, therefore, the group of output labels applied from the firstly called up sub-calculations denote a data sorting tree T which corresponds to the first input sample X=S.

The data sorting tree creating operation based on the above-described algorithm will be described with reference to FIG. 9.

Figure 9:
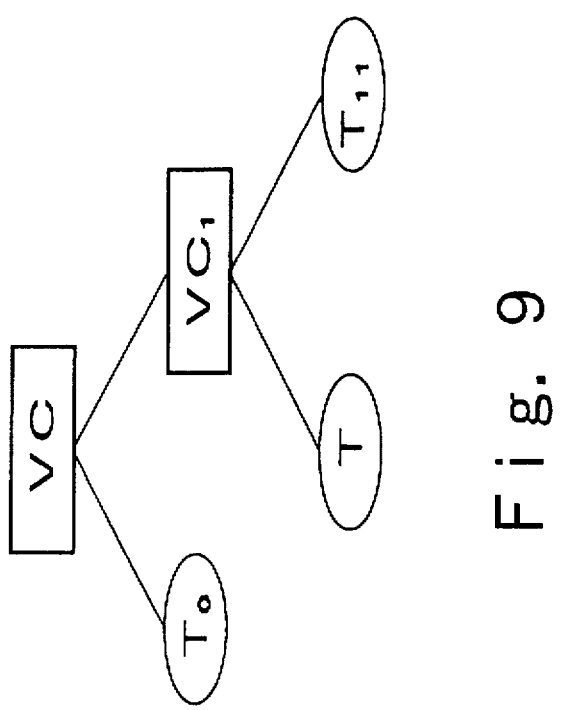
FIG. 9 shows an example of the data sorting tree created by the learning algorithm in FIG. 8.

When the sub-calculations CalcTree are carried out, as described above, relating to each of the collections $X_{vc}^1$ and $X_{vc}^0$ and a label $T_0$ relating to the collection $X_{vc}^1$, is determined in the step S3 or S6 in FIG. 8, the left side portion of a data sorting tree in which the label of a root node is the derivatives representing character string vc and the label of a leaf node forming a left branch is $T_0$ is created as shown in FIG. 9.

If the conditions of steps S1 and S4 are not satisfied and a next derivatives representing character string vc, is selected as the label of a next internal node when the sub-calculations CalcTree are carried out relating to the collection $X_{vc}^1$, the collection $X_{vc}^1$ of the selected derivatives representing character string $vc_1$ is further divided into two, and the sub- calculations CalcTree are further recursively carried out relating to each of the two collections thus obtained.

When labels $T_{10}$ and $T_{11}$, are thus determined in the step S3 or S6, relating to those collections which are obtained after the collection $X_{vc}^1$ is divided into two, the data sorting tree shown in FIG. 9 is created having a right side portion in which the derivatives representing character string vc, is labeled to an internal node, $T_{10}$ to a leaf node forming a left branch of the internal node, and $T_{11}$ to a leaf node forming a right branch of the internal node.

After the data sorting tree creator section 13a in FIG. 4 creates a data sorting tree as described above, the user asks the data sorting section 13b through the query section 14 about new examples which have not been used as training data for learning the data sorting tree created by the data sorting tree creator section 13a. In response to this query, the data sorting section 13b sorts the new examples along the data sorting tree and provides the sorting process and results thus obtained to the user.

The user can thus visually grasp the process of sorting the examples along the data sorting tree.

Figure 10:
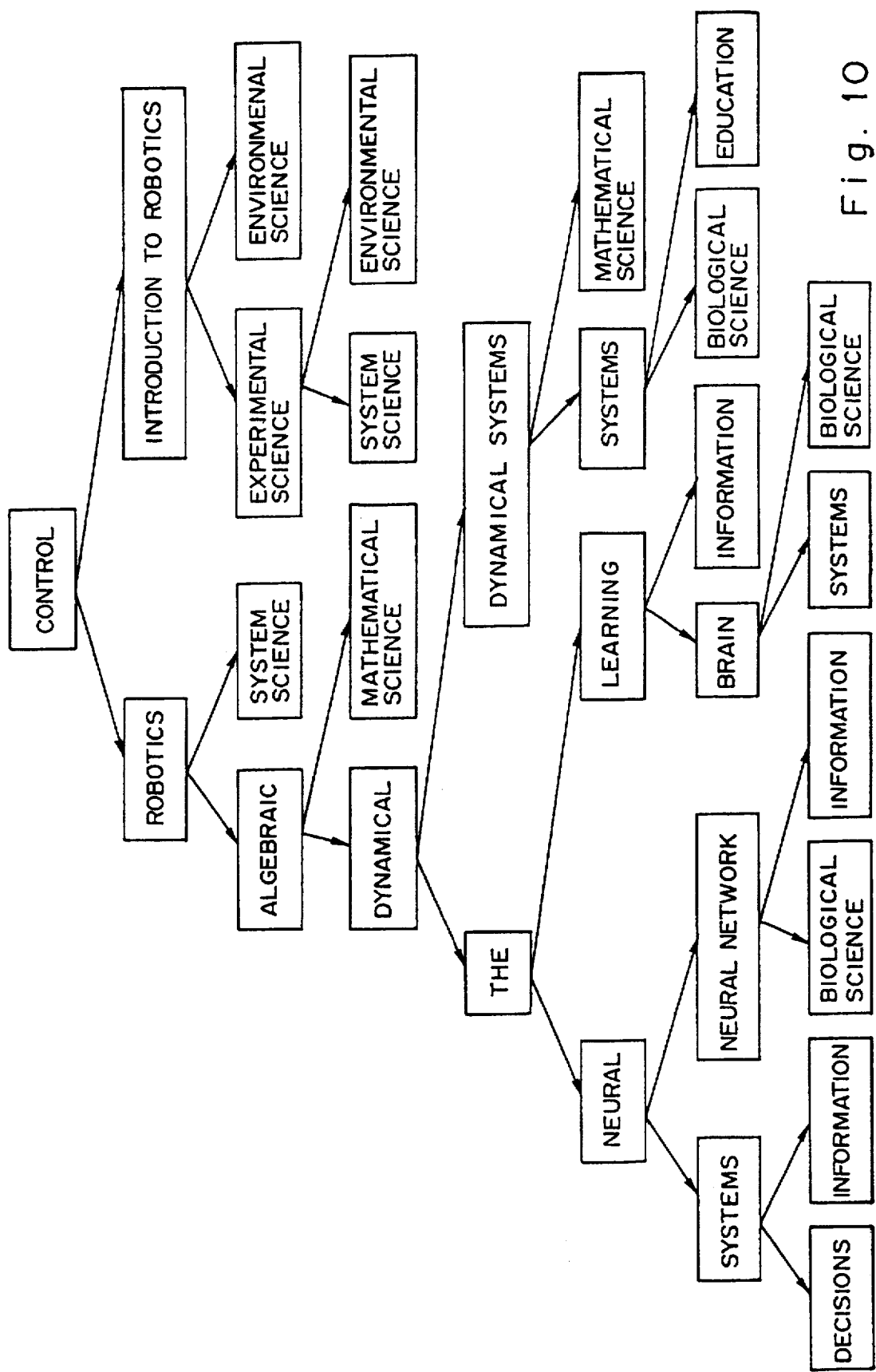
FIG. 10 shows a part of the data sorting tree created from input samples shown in FIG. 5.

FIG. 10 shows a part of the data sorting tree created by the sample shown in FIG. 5, according to the first preferred embodiment.

As is apparent from FIG. 10, it can be understood that character strings, each having a meaning as a word, are extracted even though the process of deeming an empty character as a separator for a word is not used.

FIG. 11 shows a part of examples which are sorted to a fifth sorting item (biological science, see FIG. 6) by the data sorting tree created as described above. It is apparent in FIG. 11 that books shown as the first examples must be sorted to the fifth sorting item, and that the previously given sorting item number 2 is wrong. It can be understood from this result that the sorting noise is appropriately processed in the first preferred embodiment.

Basing on the path information of a data sorting tree created as described above, the thesaurus creator section 15 traces the data sorting tree according to the manner shown in FIG. 5, creates a thesaurus as a derivatives representing character string labeled to each internal node or as a linked word of the negative of the character string, and displays it to the user.

Namely, the thesaurus of an example is expressed as a derivatives representing character string labeled to an internal node which is present on a path extending from a root node of the data sorting tree to a leaf node thereof to which the sorting class of the example is labeled, or as a linked word of the negative of the character string. When the example traces a right branch extending from each internal node (or when it includes a character string which is in the derivative relationship to it) in this case, the derivatives representing character string which is labeled to the internal node is inserted into the linked word, and when it traces a left branch extending from each internal node (or when it does not include any character string which is in the derivative relationship to it), the negative of the derivatives representing character string which is labeled to the internal node is inserted into the linked word.

In the data sorting tree shown in FIG. 10, the thesaurus creator section 15 creates the following thesaurus for the examples "education" and "biology":

Education: "DYNAMICAL" and "SYSTEMS" and (not "DYNAMICAL System),

Biology: "NEURAL" and (not "NEURAL NETWORKS").

As is apparent from the above, it can be understood that sorting classes and derivatives are appropriately related to one another without requiring any knowledge of data.

Second Preferred Embodiment

A second preferred embodiment of the present invention will be described. It also creates a data sorting tree, the same as in the case of the first preferred embodiment. It is different from the first one in that a selected word or disjunction of keywords which comprises a keyword, and two keywords connected by the logical sum, are labeled to each node of the data sorting tree.

Figure 12:
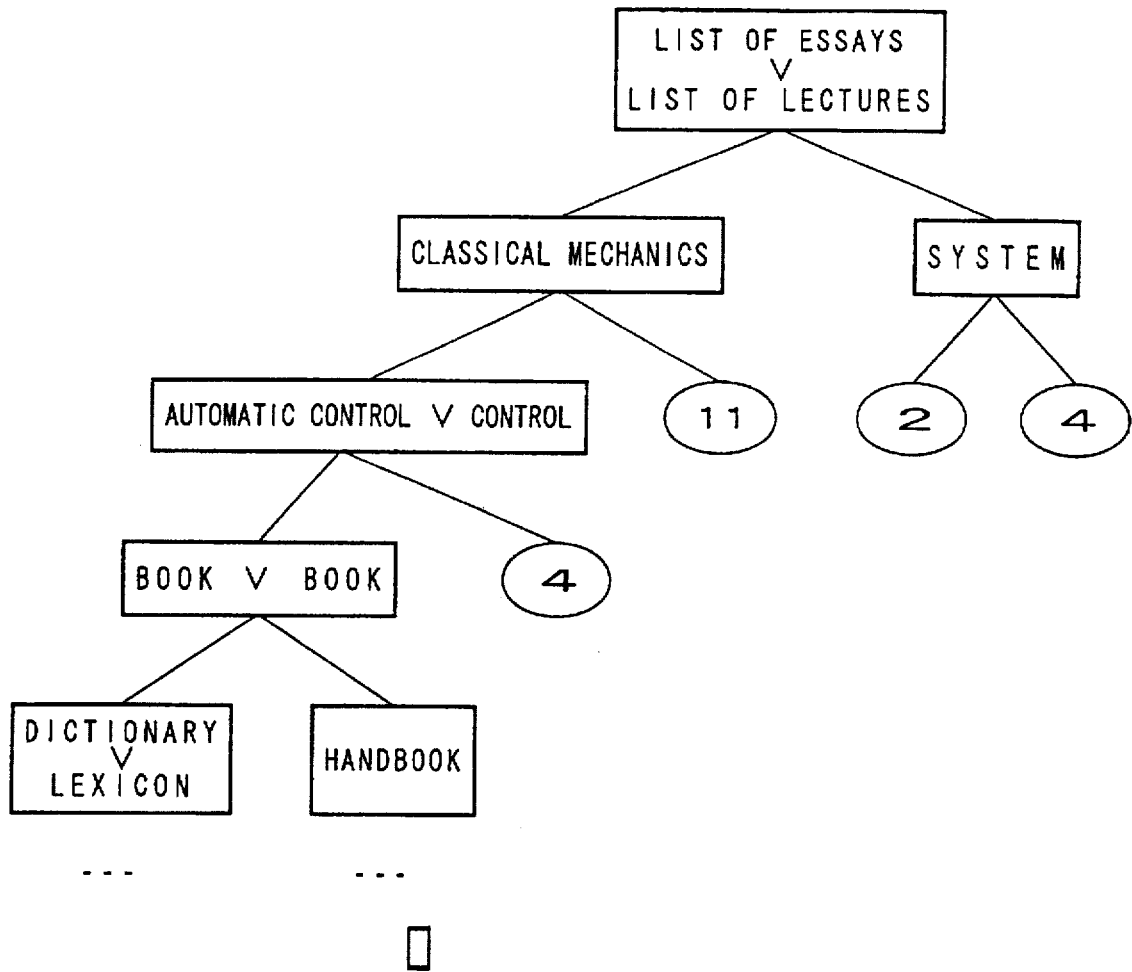
FIG. 12 shows an example of the data sorting tree in the second embodiment of the present invention.
Figure 13:
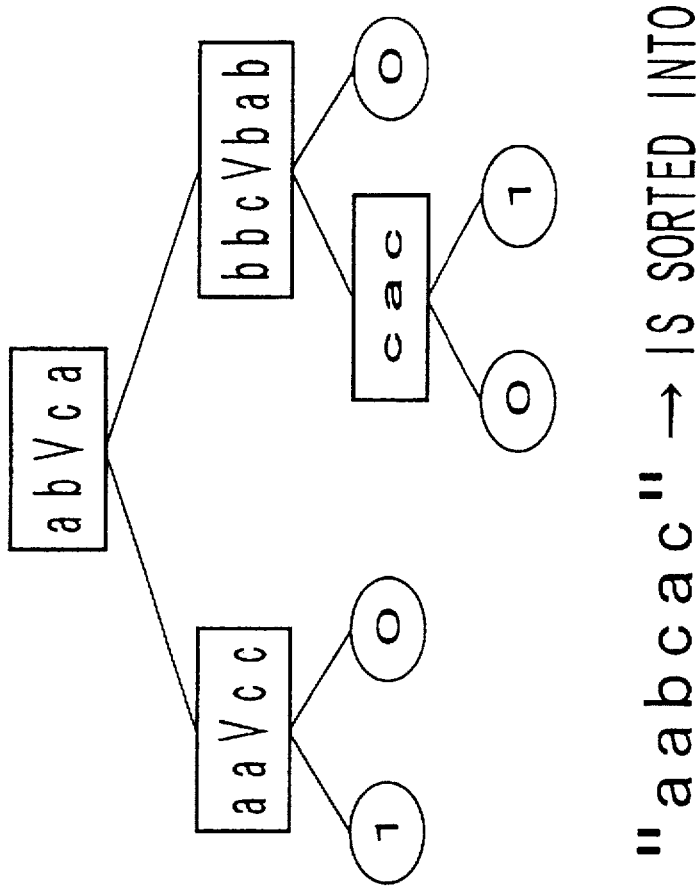
FIG. 13 is intended to explain the data sorting tree in the second embodiment of the present invention.

As shown in FIGS. 12 and 13, the data sorting tree in the second preferred embodiment is a twice-divided or binary one, in which the disjunction of keywords is labeled to each internal node (enclosed by a rectangle as shown in FIGS. 12 and 13) and the sorting class of data to each leaf node (enclosed by a circle as shown in FIGS. 12 and 13).

Each example is sorted and its sorting class is determined using the data sorting tree, as follows:

In FIG. 12, for example, an example decides a unique path extending from a root node (to which the disjunction of "collection of essays v collection of lectures" is labeled) of the data sorting tree to a leaf node thereof. If the given example includes, as a partial character string, at least one keyword which forms its disjunction labeled to the internal node, it traces the right branch of the tree. If it includes no keyword which forms its disjunction labeled to the internal node, it traces the left branch thereof.

As the result, the class name labeled to a leaf node at which the given example arrives, is the one for the given example.

In FIG. 12, for example, a given example "collection of essays in the discrete event system study meeting" includes, as a partial character string, the keyword "collection of essays" which forms the disjunction "collection of essays v collection of lectures". It therefore traces the right branch of the data sorting tree extending from the root node thereof to which the disjunction is attached. Further it includes, as a partial character string, the keyword "system" which forms the disjunction "system". It, therefore, traces the right branch extending from an internal node to which the disjunction is attached. As the result, the class to which it is sorted is a label "4".

In FIG. 13, for example, a given example "aabcac" includes, as a partial character string, the keyword "ab" which forms the disjunction "ab v ca". It therefore traces the right branch of the data sorting tree extending from the root node thereof to which the disjunction is attached. However it includes, as a partial character string, no keyword which forms the disjunction "bbc v bab". It therefore traces the right branch extending from an internal node to which this disjunction "bbc v bab" is attached. Further, it includes the keyword "cac" which forms the disjunction "cac". It therefore traces the right branch extending from an internal node to which the disjunction "cac" is attached. As the result, the class to which it is sorted is a label "1".

A more suitable data sorting tree can be created when the disjunction of keywords is labeled to the root or internal node of the data sorting tree, and when the sorting attribute of whether or not at least one keyword which forms the disjunction is included, as a partial character string in an input character string, is processed along the data sorting tree. Although the disjunction of keywords is deemed as a label for each root or internal node in the second preferred embodiment, the one of derivatives representing character strings used in the first preferred embodiment may be used as a label for each root or internal node. In this case the data sorting tree processes the sorting attribute of whether or not at least one derivatives representing character string which forms the disjunction of the derivatives representing character strings or its derivative, is included in an input character string. The data sorting tree will hereinafter process the disjunction of common keywords for the clarity of description.

Figure 14:
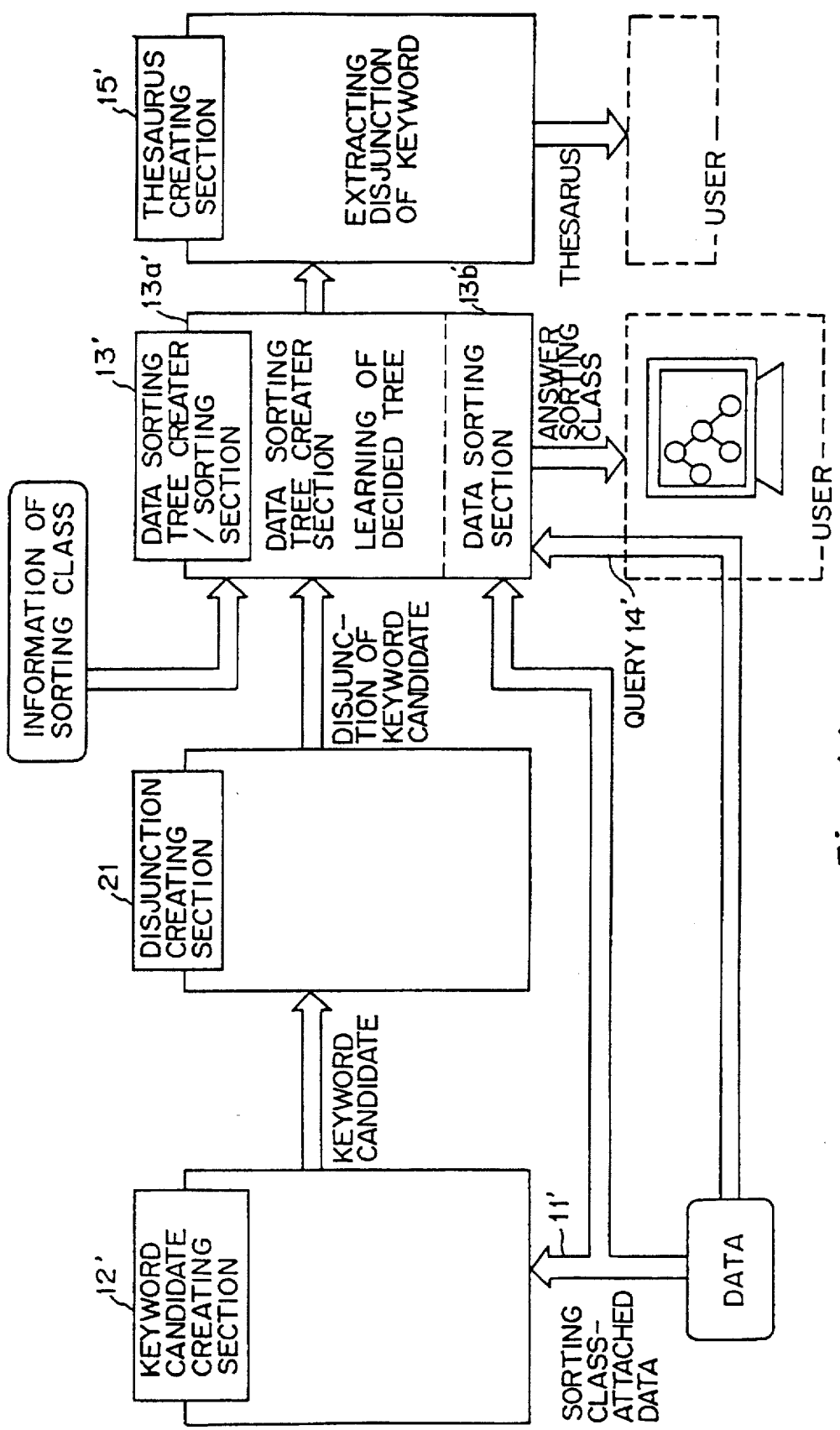
FIG. 14 shows the whole arrangement of a system according to the second embodiment of the present invention.

FIG. 14 shows the whole arrangement of a system according to the second embodiment of the present invention.

Components of the second preferred embodiment shown in FIG. 14 to which same reference numerals are attached, although each having a (') on its shoulder, as those in the first preferred embodiment shown in FIG. 4, have same fundamental functions. The arrangement shown in FIG. 14, however, is quite different from the one shown in FIG. 4, in that the former has a disjunction creator section 21 for creating a disjunction from keyword candidates, and inputting it to the data sorting tree creator section 13a'.

The data input section 11' allows the user to input an example and a collection of its sorting classes into the system.

The keyword candidates creating section 12' creates keyword candidates from an example in the sample. It creates, as keyword candidates, all of partial character strings each having a length of characters which is within a predetermined range.

The disjunction creator section 21 creates a disjunction of each keyword candidate created by the keyword candidates creating section 12'.

The data sorting tree creating/sorting section 13' learns the data sorting tree on the basis of an algorithm, which will be described later, while using a list of selected words or disjunctions of keyword candidates created by the selected word or disjunction creator section 21.

The query section 14' queries the data sorting section 13' regarding new examples which have not been used as training data to learn the data sorting tree by the data sorting tree creator section 13a'. When it is queried by the query section 14', the data sorting section 13b' sorts the queried new examples according to the data sorting tree and displays its sorting process and results to the user.

The thesaurus creator section 15' creates, as a thesaurus, a group of keywords which forms a disjunction, every disjunction labeled to each root or internal node of the data sorting tree learned by the data sorting tree creator section 13a', and displays it to the user. As described above, the second preferred embodiment is characterized by the thesaurus being is automatically provided at the same time as the data sorting tree is created.

It will be described how keyword candidates and a disjunction of the keyword candidates are extracted in the second preferred embodiment, and how data is sorted and processed on the basis of results thus extracted.

A list of samples and sorting items used by the second preferred embodiment is the same as that used by the first one, and is shown in FIGS. 5 and 6.

When each example of the sample shown in FIG. 5 is inputted into the input section 11' through the keyword candidate creator section 12', the same as in the derivatives representing character string candidate creator section 12 shown in FIG. 4, this keyword candidate creator section 12' outputs, as keyword candidates, partial character strings each being included in the title of the example inputted, and each having a number of character s which is within a predetermined range. The keyword candidates thus created are as shown in FIG. 7, as seen in the case of the first preferred embodiment. A partial character string having a number of characters larger than 3 but smaller than 12, is outputted as a keyword candidate in the second preferred embodiment. Keyword candidates can be created in this manner without requiring any grammatical knowledge.

The disjunction creator section 21 creates a list of disjunctions of those keyword candidates which are created by the keyword candidate creator section 12'. The term "list or collection of disjunctions of keyword candidates" used here means a list of two optional keyword candidates which are selected from those created by examples of the sample and which are connected each other by the logical sum, and of each keyword candidate itself.

The data sorting tree creator section 13a' then learns the data sorting tree, as follows, while using the list of selected words or disjunctions of the keyword candidates created by the disjunction creator section 21:

Firstly, the sorting attribute used in the learning algorithm of the data sorting tree in the second preferred embodiment is defined as follows:

When the sorting attribute relating to the disjunction r of a character string u included in a list $\Sigma^*$ of character strings, each having an optional number of characters is $K_r(u)$, this $K_r(u)$ has the following meaning:

$K_r(u)$ is true $\longleftrightarrow$ "character string u includes, as a partial character string, at least one of the keywords which form the disjunction r".

For example, the sorting attribute $K_r(u)$ relating to the disjunction "a list of essays v a list of lectures" of the character string u "a list of lectures and essays in the discrete event system study meeting" becomes true (see FIG. 12).

Basing on the above-described definition of the sorting attribute, the data sorting tree creator section 13a' selects the disjunction of keywords from keyword candidates, which are created by the disjunction creator section 21, to create the data sorting tree, as follows.

Figure 15:
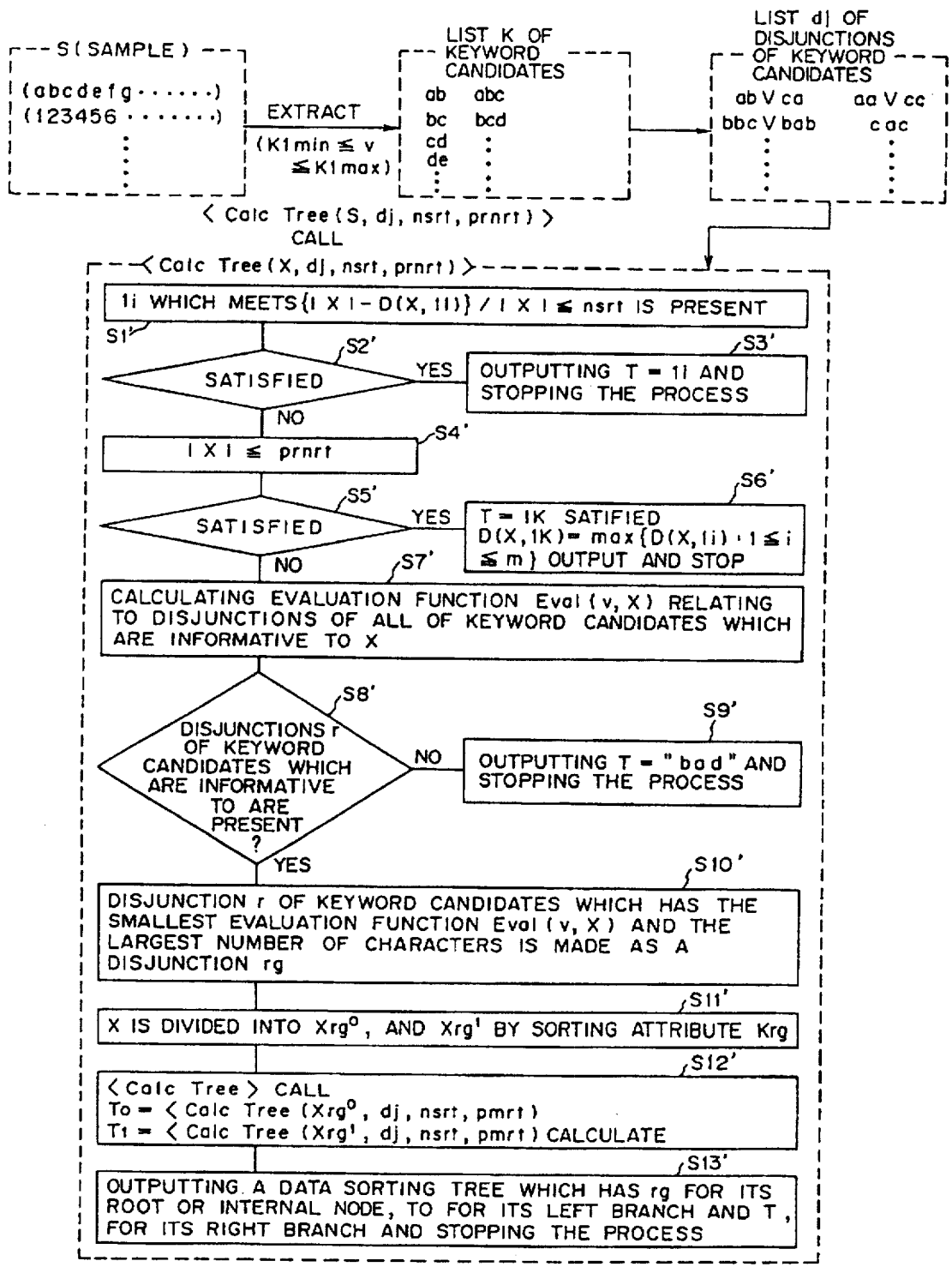
FIG. 15 is a flow chart showing a learning algorithm in the second embodiment of the present invention.

FIG. 15 is an operation flow chart showing the learning algorithm in the second preferred embodiment.

Steps in FIG. 15 to which the same reference numerals are attached as those in FIG. 8, although having (') on their shoulders, are fundamentally the same in function.

Symbols $X_r^1$ and $X_r^0$ in the operation flow chart in FIG. 15 are defined by the following equations (11) and (12):

$$X_r^1 = \{(w, l) \in X | K_r(w) \text{ is true}\} \quad (11)$$

$$X_r^0 = \{(w, l) \in X | K_r(w) \text{ is false}\} \quad (12)$$

The definitions of these symbols $X_r^1$ and $X_r^0$ correspond to those of symbols $X_v^1$ and $X_v^0$ as defined by equations (4) and (5). Namely, a list or collection of examples (w, 1) included in a sample X in which the sorting attribute $K_r(w)$ relating to the disjunction r is true, is defined to be $X_r^1$, and a list or collection of examples (w, 1) included in the sample X in which the sorting attribute $K_r(w)$ is false, is defined to be $X_r^0$. In other words, a list of examples (w, 1) in the sample X including, as a partial character string, at least one keyword which forms the disjunction r, is defined to be $X_r^1$, and a list of examples (w, 1) in the sample X including, as a partial character string, no keyword which forms the disjunction r, is defined to be $X_r^0$.

A symbol D (X, c) is defined by equation (6), as seen in the case of the first preferred embodiment, and it represents the number of examples (w, 1) in which the label 1 of a sorting class is equal to label c.

Further, the evaluation function Eval(r, X) used in the operation flow chart in FIG. 15, is defined by equation (13) as follows:

$$I(X) = -\sum_{j=1}^{m} \frac{|D(X, l_j)|}{|X|} \log_2 \frac{|D(X, l_j)|}{|X|} \quad (13)$$

$$Eval(r, X) = \frac{|X_r^0|}{|X|} I(X_r^0) + \frac{|X_r^1|}{|X|} I(X_r^1)$$

The definition of this evaluation function Eval(r, X) corresponds to the one Eval(v, X) in the first preferred embodiment.

Steps shown in the operation flow chart in FIG. 15 will be described successively.

The keyword candidate creator section 12' extracts keyword candidates v from a sample S inputted through the data input section 11'. The same as in the derivatives representing character string candidate creator section 12 of the first preferred embodiment, it extracts a list k of keyword candidates v, as shown by equation (8), while using parameters $K1_{min}$ and $K1_{max}$ (it is set in the second preferred embodiment that $K1_{min}=3$ and that $K1_{max}=12$), relating to the lengths of character strings inputted at the same time. Namely, the list of partial character strings which are those of character strings w (which correspond to the titles listed in FIG. 5) included in the input sample S, and which have a number of characters larger than $K1_{min}$ but smaller than $K1_{max}$ is extracted as for that of keyword candidates.

The disjunction creator section 21 then creates a list of disjunctions of keyword candidates created by the keyword candidate creator section 12', based on the following equation (14):

$$\text{Disjunction } dj = \{\upsilon_1 \vee \upsilon_2 | \upsilon_1, \upsilon_2 \in \text{keyword}\} \cup \text{keyword} \quad (14)$$

Namely, a list of two optional keywords which are selected from keyword candidates included in the list k, and which are connected to each other by the logical sum, and of each keyword candidate itself is created as for that of dj of disjunctions of keyword candidates.

The data sorting tree creator section 13a' then carries out the following steps S1'–S11', which are sub-calculations CalcTree (S, dj, nsrt, prnrt) and creates a data sorting tree T as the calculation results obtained by the sub-calculations CalcTree. The input sample S is replaced by the one X in the description made below.

The sub-calculation CalcTree is a process of sorting the list of examples in the input sample into one of examples which include, as a partial character string, at least one keyword forming the disjunctions of keywords, (selected as will be described later), and the other of examples which do not include any keyword. A set of twice-divided trees connected to an internal node (enclosed by a rectangle as shown in FIGS. 12 and 13) to which a set of keyword disjunctions are labeled, are thus created. As seen in the first preferred embodiment, two sub-calculations CalcTree, each having one of the two divided lists, are recursively called up in this case, and two further sub-calculations CalcTree are also recursively called up out of each of the firstly called up sub-calculations CalcTree. As the result, branches of the data sorting tree extend further and further to leaf nodes (each enclosed by a circle as shown in FIGS. 12 and 13). When the lower sub-calculations CalcTree recursively called up are successively completed and the firstly called up sub-calculations CalcTree are also completed, the data sorting tree T which corresponds to the first input sample X=S is then complete.

A series of steps S1'–S6' in the sub-calculation CalcTree (X, dj, nsrt, prnrt) are same as those S1–S6 shown in FIG. 8, and they are intended to stop further sorting of the list of examples which belong to the input sample X.

When conditions of step S2' and S5' are not satisfied and the answer of step S5' is NO, or when it is decided that the list of examples which belong to the input sample X must be further sorted (or the branch of the data sorting tree must be further extended), the data sorting tree creator section 13a' carries out a series of steps S7'–S13'.

Firstly, the data sorting tree creator section 13a' calculates, in the step S7', the evaluation function Eval(r, X) as defined by equation (13), relating to the disjunctions r of all keyword candidates which are informative to the input sample X. "The disjunctions r of keyword candidates which are informative to the input sample X" are those in which the list $X_r^1$ is not empty, and the list $X_r^0$ is also not empty, when the list of examples (w, 1) belonging to the input sample X is sorted to the one $X_r^1$ (equation (11)) whose sorting attribute $K_r(w)$ is true, and the other $X_r^0$ (equation (12)) whose sorting attribute $K_r(w)$ is false. It is necessary in the calculation of the evaluation function Eval(r, X) that the list of examples belonging to the input sample X is divided into the one $X_r^1$ in which the sorting attribute Kr relating to the disjunctions r of keyword candidates is true, and the other $X_r^0$ in which the sorting attribute $K_r$ is false (see equation 13). This dividing process is the same as that in the step S11'.

The data sorting creator section 13a' then checks, in the step S8', whether or not the disjunction r of keyword candidates which are informative to the sample X, is present in the step S7'.

When no disjunction of keyword candidates which are informative to the input sample X is present and the answer of step S8' is NO, the data sorting tree creator section 13a' outputs, in the step S9', an error "bad" which is a calculation result T obtained by the sub-calculation CalcTree. In this case the suitable data sorting tree T is not created.

When the disjunction r of keyword candidates which are informative to the input sample X is present and the answer of step S8' is YES, the data sorting tree creator section 13a' selects, as a disjunction rg of keywords, from the disjunction r of keyword candidates, in the step S10', which has the smallest value of the evaluation function Eval(r, X), when calculated in the step S7', and the longest length of character string.

Then in the step S11', the data sorting tree creator section 13a' removes the disjunction rg of keywords from the list dj of the disjunctions r of keywords and sorts the list of examples belonging to the input sample X in the sub-calculation CalcTree which is being carried out into a list $X_{rg}^1$, in which the sorting attribute $K_{rg}$ relating to the disjunction rg of keywords is true, and another list $X_{rg}^0$ in which the sorting attribute $K_{rc}$ is false. In the step S11', therefore, the list of examples belonging to the input sample X is divided into the one $X_{rg}^1$ which includes, as a partial character string, at least one keyword forming the disjunction rg of keywords, and the other $X_{rg}^0$ which includes, as a partial character string, no keyword forming the disjunction rg of keywords.

The disjunction may be the one of derivatives representing character strings which are examples of keywords. Based on the same algorithm as in the step S11 in FIG. 8, the list of examples belonging to the input X is sorted in this case into the one $X_{rg}^1$ which includes, as a partial character string, at least one derivatives representing character string forming the disjunction rg or a derivative from this character string, and the other $X_{rg}^0$ which includes neither derivatives representing character string forming the disjunction rg nor its derivative.

As described above, the list of examples belonging to the input sample X is divided in the step S11' into the one $X_{rg}^1$ which includes, as a partial character string, at least one keyword forming the disjunction rg of keywords, and the other $X_{rg}^0$. As the result, a set of twice-divided trees connected to an internal node (enclosed by a rectangle as shown in FIGS. 12 and 13) to which a set of keyword disjunctions rg are labeled, is created.

Further in the step S12', the data sorting tree creator section 13a' recursively calls up two sub-calculations CalcTree($X_{rg}^1$, dj, nsrt, prnrt) and ($X_{rg}^0$, dj, nsrt, prnrt) each having one of the lists $X_{rg}^1$ and $X_{rg}^0$ as an input, and these sub-calculations are carried out.

When calculation results $T_0$ and $T_1$ by the two sub-calculations CalcTree are determined, the data sorting tree creator section 13a' outputs in the step S13' a group T of output labels in which the keyword disjunction rg is set as a label for the root or internal node, $T_0$ as labels (or label group) for left branches connected to this node, and $T_1$ as labels (or label group) for right branches connected to the node, and it stops the process in which the step S13' is included.

When the sub-calculations CalcTree are stopped as the result that the steps S1' and S6' are carried out, each of their calculation results $T_0$ and $T_1$ represents sorting classes labeled to leaf nodes (enclosed by circles as shown in FIGS. 12 and 13). When they are stopped as the result that the step S13' is carried out after each of them recursively calls up two further sub-calculations CalcTree, each of their calculation results $T_0$ and $T_1$ represents a group of output labels which comprise a keyword labeled to a root or internal node (enclosed by a rectangle as shown in FIGS. 12 and 13), labels (or label group) for left branches connected to this node, and labels (or label group) for right branches connected to this node.

When the lower recursively called up sub-calculations CalcTree are successively stopped and the firstly called up ones are completed, therefore, a group of output labels applied from them denote the data sorting tree T which corresponds to the first input sample X=S.

After the data sorting tree creator section 13a' creates the data sorting tree in this manner, the user queries the data sorting section 13b' through the query section 14' about new examples which have not been used as training data for learning the data sorting tree created by the data sorting tree creator section 13a'. In response to this query, the data sorting section 13b' sorts the new examples queried according to the data sorting tree created, and displays its sorting process and results to the user.

In addition, the thesaurus creator section 15' creates a thesaurus with a group of disjunction forming keywords, every disjunction labeled to the root or internal node of the data sorting tree created as described above, and displays it to the user.

When a disjunction which comprises two keyword groups is labeled to the root or internal node, this labeling is employed from the viewpoint that it is more advantageous that this disjunction is used in data sorting. This teaches that a strong relationship is present between two keywords which form the disjunction. It is therefore natural that the thesaurus is created with the keyword group which forms the disjunction.

FIG. 16 shows examples of thesauri (or related words) created from the data sorting tree in the second preferred embodiment. It is apparent from FIG. 16 that suitable thesauri have been created.

Although two keywords connected to each other by the logical sum have been used as disjunctions labeled to each node of the data sorting tree in the above-described second preferred embodiment, three or a plurality of keywords connected to one another by the logical sum may be used as disjunctions if the system allows it.

What is claimed is:

1. An apparatus for sorting input character data, comprising:
   means for storing a data sorting binary tree to internal nodes of which derivatives representing character strings are labeled and derivatives are defined by the following formula $s=min(u, v), s=s'a(a\in\Sigma) \exists t\in\Sigma^1\cup\Sigma^2\cup\Sigma^3 \ldots \cup\Sigma^n(s't=max(u, v))$ where u and v represent character strings forming derivatives;

s' is obtained by removing an optional character string a of a length 1 from s;

t represents a character string;

$\Sigma^n$ is a collection of optional characters having a length of n and n is a positive integer; and means for carrying out branching operations on the basis of evaluation results obtained while evaluating the sorting attribute to determine whether the input character data includes, as a partial character string, a derivatives representing character string or its derivative labeled to each internal node of the data sorting binary tree, and sorting the input character data to a sorting class labeled to a leaf node of the data sorting binary tree finally arrived at after starting from an internal or root node of the data sorting binary tree.

2. An apparatus for creating a data sorting tree to sort input character data, comprising:

means for creating derivatives representing character string candidates, which are used to sort character data, from a list of examples of the character data which can be sequentially expressed, where character string candidates are defined by the following formula $s=min(u, v), s=s'a(a\in\Sigma), \exists t\in\Sigma^1\cup\Sigma^2\cup\Sigma^3 \ldots \cup\Sigma^n(s't=max(u, \mu))$ where u and v represent character strings forming derivatives;

s' is obtained by removing an optional character string a of a length 1 from s;

t represents a character string;

$\Sigma^n$ is a collection of optional characters having a length of n and n is a positive integer; and means for selecting a derivatives representing character string from the derivatives representing character string candidates based on the evaluation results obtained while evaluating the sorting attribute of whether each example of the character data includes, as a partial character string, the derivatives representing character string candidates or derivatives thereof and labeling the derivatives representing character string to an internal node, and successively sorting examples of the character data based on the evaluation results obtained while evaluating the sorting attribute of whether each example of the character data includes, as partial character data, the derivatives representing character string or a derivative thereof, to thereby create a data sorting binary tree to the internal node of which the derivatives representing character string is labeled.

3. The data sorting tree creator apparatus according to claim 2, wherein said derivatives representing character string candidate creator means creates, as the derivatives representing character string candidates, all of the partial character strings, each having a number of characters which is within a certain range, from the list of examples of the character data.

4. The data sorting tree creator apparatus according to claim 2, wherein said data sorting tree creator means includes means for changing the derivatives representing character string candidate or the end of the derivatives representing character string according to a certain rule, and means for extracting character strings obtained by the changing means as the derivatives representing character string candidates or derivatives of the derivatives representing character strings.

5. The data sorting tree creator apparatus according to claim 2, wherein said data sorting tree creator means creates the data sorting binary tree by a) deciding whether the rate at which labels are attached to examples of the character data in the list of examples of the character data inputted are not the same is smaller than a certain threshold value or whether the number of examples in the list of examples of the character data inputted is smaller than a certain threshold value;

b) outputting a same label, which is the maximum number appearing the list of examples of the character data inputted, as one for a leaf node of the data sorting tree and stopping the process, when the condition of a) is satisfied;

c) selecting from the derivatives representing character string candidates, one derivatives representing character string that is the best in certain evaluation results, including those obtained by evaluating the sorting attribute of whether each example of the character data inputted includes, as a partial character string, the one derivatives representing character string or the derivative thereof, and that has the largest number of characters, when the condition of a) is not satisfied;

d) successively sorting examples of the character data based on evaluation results obtained by evaluating the sorting attribute of whether each example of the character data includes, as a partial character string, the derivatives representing character string selected by said selecting in step c) or the derivative thereof;

e) recursively and repeatedly carrying out steps a) through d) relating to each list of examples of the character data sorted by said sorting in step d); and f) setting the derivatives representing character string selected by said selecting in step c) as a label for one of the internal nodes and labels or group of labels outputted as results of step e) as those for branches connected to the internal node, when step e) is stopped, and outputting these labels or group of labels and stopping the process.

6. A thesaurus creator apparatus using a data sorting binary tree, to internal nodes of which derivatives representing character strings are labeled and derivatives are defined by the following formula $s=min(u, v), s=s'a(a\in\Sigma) \exists t\in\Sigma^1\cup\Sigma^2\cup\Sigma^3-\cup\Sigma^n(s't=max(u, \mu))$ where u, μ represent character strings forming derivatives;

s' is obtained by removing an optional character string a of a length 1 from s;

t represents a character string;

$\Sigma^n$ is a collection of optional characters having a length of n and n is a positive integer, said thesaurus creator apparatus comprising:

a unit to create a thesaurus of examples of desired character data with words linked to derivatives representing character strings which are labeled to the internal nodes present on a path extending from a root node of the data sorting tree to leaf nodes thereof to which sorting classes of the examples of desired data are labeled, or with words linked to negatives of the derivatives representing character strings.

7. A data processing system for carrying out data processing to sort character data, comprising:

a data sorting tree creator apparatus including:

means for creating derivatives representing character string candidates, which are used to sort character data, from a list of examples of the character data which can be sequentially expressed, where the derivatives are defined by the following formula $$s=min(u, v), s=s'a(a\in \Sigma) \exists t\in \Sigma^1 \cup \Sigma^2 \cup \Sigma^3 - \cup \Sigma^n (s't=max(u, \mu))$$

where u, μ represent character strings forming derivatives;

S' is obtained by removing an optional character string a of a length 1 from s;

t represents a character string;

$\Sigma^n$ is a collection of optional characters having a length of n and n is a positive integer; and means for selecting a derivatives representing character string from the derivatives representing character string candidates based on the evaluation results obtained while evaluating the sorting attribute of whether each example of the character data includes, as a partial character string, the derivatives representing character string candidates or derivatives thereof, and labeling the derivatives representing character string to an internal node, and successively sorting examples of the character data based on the evaluation results obtained while evaluating the sorting attribute of whether each example of the character data includes, as a partial character data, the derivatives representing character string or a derivative thereof, to thereby create a data sorting binary tree to the internal node of which the derivatives representing character string is labeled; and a data sorting apparatus including:

means for carrying out branching operations based on evaluation results obtained while evaluating the sorting attribute of whether the input character data includes, as a partial character string, a derivatives representing character string or the derivative thereof labeled to each internal node of the data sorting tree, and sorting the input character data to a sorting class labeled to a leaf node of the data sorting tree finally arrived at after starting from an internal or root node of the data sorting tree created by the data sorting tree creator apparatus.

8. A data processing system for carrying out data processing to sort character data, comprising:

a data sorting tree creator apparatus including
means for creating derivatives representing character string candidates, which are used to sort character data, from a list of examples of the character data which can be sequentially expressed, where the derivatives are defined by the following formula $$s=min(u, v), s=s'a(a\in \Sigma) \exists t\in \Sigma^1 \cup \Sigma^2 \cup \Sigma^3 - \cup \Sigma^n (s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer; and means for selecting a derivatives representing character string from the derivatives representing character string candidates based on the evaluation results obtained while evaluating the sorting attribute of whether each example of the character data includes, as a partial character string, the derivatives representing character string candidates or derivatives thereof and labeling the derivatives representing character string to an internal node, and successively sorting examples of the character data based on the evaluation results obtained while evaluating the sorting attribute of whether each example of the character data includes, as a partial character data, the derivatives representing character string or a derivative thereof, to thereby create a data sorting binary tree to the internal node of which the derivatives representing character string is labeled;

a data sorting apparatus including means for carrying out branching operations based on evaluation results obtained while evaluating the sorting attribute of whether the input character data includes, as a partial character string, a derivatives representing character string or the derivative thereof labeled to each internal node of the data sorting tree, and sorting the input character data to a sorting class labeled to a leaf node of the data sorting tree finally arrived at after starting from an internal or root node of the data sorting tree created by the data sorting tree creator apparatus; and a thesaurus creator apparatus including means for creating a thesaurus of examples of desired character data with words linked to derivatives representing character strings which are labeled to the internal nodes present on a path extending from a root node of the data sorting tree to leaf nodes thereof to which sorting classes of the examples of desired data are labeled, or strings.

9. An apparatus for extracting derivatives of character strings, comprising:

means for changing the end of the character string inputted according to a certain rule; and means for extracting the character string obtained by the changing means as a derivative representing character string candidate or a derivative thereof, wherein the derivative is defined by the following formula $$s=min(u, v), s=s'a(a\in \Sigma) \exists t\in \exists \Sigma^1 \cup \Sigma^2 \cup \Sigma^3 - \cup \Sigma^n (s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

10. A method of sorting input character data, comprising:

storing a data sorting binary tree to internal nodes of which derivatives representing character strings are labeled;

carrying out branching operations based on evaluation results obtained while evaluating the sorting attribute of whether the input character data includes, as a partial character string, a derivative representing character string or a derivative thereof labeled to each internal node of the data sorting tree, where the derivative is defined by the following formula $$s=min(u, v), s=s'a(a\in \Sigma) \exists t\in \exists \Sigma^1 \cup \Sigma^2 \cup \Sigma^3 - \cup \Sigma^n$$

where u, μ represent character strings forming derivatives;

s' is obtained by removing an optional character string a of a length 1 from s;

t represents a character string;

$\Sigma^n$ is a collection of optional characters having a length of n and n is a positive integer; and sorting the input character data to a sorting class labeled to a leaf node of the data sorting tree finally arrived at after starting from an internal or root node of the data sorting tree.

11. A method of creating a data sorting tree to sort character data inputted, comprising:

creating derivatives representing character string candidates, which are used to sort character data, from a list of examples of the character data which can be sequentially expressed, where the derivatives are defined by the following formula $$s=min(u, v), s=s'a(a\in \Sigma) \exists t\in \exists \Sigma^1\cup\Sigma^2\cup\Sigma^3-\cup\Sigma^n(s' t=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer; and selecting a derivatives representing character string from the derivatives representing character string candidates based on the evaluation results obtained while evaluating the sorting attribute of whether each example of the character data includes, as a partial character string, the derivatives representing character string candidates or derivatives thereof and labeling the derivatives representing character string to an internal node, and successively sorting examples of the character data based on the evaluation results obtained while evaluating the sorting attribute of whether each example of the character data includes, as partial character data, the derivatives representing character string or a derivative thereof, to thereby create a data sorting binary tree to the internal node of which the derivatives representing character string is labeled.

12. The method of creating a data sorting tree according to claim 11, whereby the data sorting tree is created by a) deciding whether the rate at which labels are attached to examples of the character data in the list of examples of the character data inputted is not same but smaller than a certain threshold value or whether the number of examples in the list of examples of the character data inputted is smaller than a certain threshold value;

b) outputting the same label, which is maximum number appearing in the list of examples of the character data inputted, as one for a leaf node of the data sorting tree and stopping the process, when the condition of a) is satisfied;

c) selecting from the derivatives representing character string candidates, one derivatives representing character string, that is the best in certain evaluation results including those obtained by evaluating the sorting attribute of whether each example of the character data inputted includes, as a partial character string, the one derivatives representing character string or a derivative thereof, and that has the largest number of characters, when the condition of a) is not satisfied;

d) successively sorting examples of the character data based on evaluation results obtained by evaluating the sorting attribute of whether each example of the character data includes, as a partial character string, the derivatives presenting character string selected by said selecting in step c) or a derivative thereof;

e) recursively and repeatedly carrying out steps a) through d) relating to each list of examples of the character data sorted by said sorting in step d); and f) setting the derivatives representing character string selected by said selecting in step c) as a label for one of the internal nodes and labels or group of labels outputted as results of step e) as those for branches connected to the internal node, when step e) is stopped, and outputting these labels or group of labels and stopping the process.

13. A method of creating a thesaurus using a data sorting binary tree, to internal nodes of which derivatives representing character strings are labeled, comprising:

creating a thesaurus of examples of desired character data with words linked to derivatives representing character strings which are labeled to the internal nodes present on a path extending from a root node of the data sorting tree to leaf nodes thereof to which sorting classes of the examples of desired data are labeled, or with words linked to negatives of the derivatives representing character strings, where the derivative are defined by the following formula $$s=min(u, v), s=s'a(a\in \Sigma) \exists t\in \exists \Sigma 1-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

14. A method extracting derivatives of character strings, comprising:

changing which character ends a character string inputted according to a certain rule; and extracting the character string obtained by said changing means as a derivative representing character string candidate or a derivative thereof, wherein the derivative is defined by a formula $$s=min(u, v), s=s'a(a\in \Sigma) \exists t\in \exists \Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

15. An apparatus for sorting input character data, comprising:

means for storing a data sorting binary tree to internal nodes of which selected words or disjunctions of keywords are labeled, and means for carrying out branching operations based on evaluation results obtained while evaluating the sorting attribute of whether the input character data matches at least one keyword which forms the disjunctions of keywords labeled to the internal nodes of the data sorting tree, and sorting the input character data to a sorting class labeled to a leaf node of the data sorting tree finally arrived at after starting from an internal or root node of the data sorting tree created by the data sorting tree creator apparatus, wherein the keywords are defined by the following formula $$s=min(u, v), s=s'a(a\in \Sigma) \exists t\in \exists \Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

16. An apparatus for creating a data sorting tree to sort character data inputted, comprising:

means for creating keyword candidates, which are used to sort the character data, from a list of examples of the character data which can be sequentially expressed, wherein the keyword candidates are defined by the following formula $$s=min(u, v), s=s'a(a\in \Sigma) \; \exists t\in \exists\Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer;

means for creating disjunctions of the keyword candidates as the keyword candidates or logical sums thereof; and means for selecting a disjunction of keywords from those of the keyword candidates based on the evaluation results obtained while evaluating the sorting attribute of whether each example of the character data matches at least one keyword candidate which forms the disjunctions of the keyword candidates and labeling the derivatives representing character string to an internal node, and successively sorting examples of the character data based on the evaluation results obtained while evaluating the sorting attribute of whether each example of the character data matches at least one keyword which forms the disjunction of keyword selected, to thereby create a data sorting binary tree to the internal node of which the disjunction of keyword is labeled.

17. The data sorting tree creator apparatus according to claim 16, wherein said keyword candidate creator means creates, as the keyword candidates, all of partial character strings, each having a number of characters which is within a predetermined range, from the list of examples of the character data.

18. The data sorting tree creator apparatus according to claim 16, wherein said data sorting tree creator means creates the data sorting tree by a) deciding whether the rate at which labels attached to examples of the character data in the list of examples of the character data inputted are not same is smaller than a certain threshold value or whether the number of examples in the list of examples of the character data inputted is smaller than a certain threshold value;

b) outputting the same label, which is the maximum in number appearing the list of examples of the character data inputted, as one for a leaf node of the data sorting tree and stopping the process, when the condition of a) is satisfied;

c) selecting from the disjunctions of the keyword candidates created, one keyword disjunction, that is the best in certain evaluation results including those obtained by evaluating the sorting attribute of whether not each example of the character data inputted matches at least one keyword candidate which forms the disjunctions of the keyword candidates created, and that has the largest number of characters, when the condition of a) is not satisfied;

d) successively sorting examples of the character data based on evaluation results obtained by evaluating the sorting attribute of whether each example of the character data matches at least one keyword which forms the keyword disjunction selected by said selecting in step c);

e) recursively and repeatedly carrying out steps a) through d) relating to each list of examples of the character data sorted by said sorting in step d); and f) setting the keyword disjunction selected by said selecting in step c) as a label for one of the internal nodes and labels or group of labels outputted as results of step e) as those for branches connected to the internal node, when step e) is stopped, and outputting these labels or group of labels and stopping the process.

19. A thesaurus creator apparatus using a data sorting binary tree to a root or each internal node of which a keyword disjunction is labeled, comprising:

a unit to create a thesaurus with a group of keywords, which form the disjunction, every keyword disjunction labeled to the root node or each internal node of the data sorting tree, wherein keywords are defined by the following formula $$s=min(u, v), s=s'a(a\in \Sigma) \; \exists t\in \exists\Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

20. A data process system for carrying out data process to sort character data inputted, comprising:

a data sorting tree creator apparatus including:

means for creating keyword candidates, which are used to sort the character data, from a list of examples of the character data which can be sequentially expressed, wherein keyword candidates are defined by the following formula $$s=min(u, v), s=s'a(a\in \Sigma) \; \exists t\in \exists\Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer;

means for creating disjunctions of the keyword candidates as the keyword candidates or logical sums thereof; and means for selecting a disjunction of keywords from those of the keyword candidates based on the evaluation results obtained while evaluating the sorting attribute of whether each example of the character data matches at least one keyword candidate which forms the disjunctions of the keyword candidates and labeling the derivatives representing character string to an internal node, and successively sorting examples of the character data based on the evaluation results obtained while evaluating the sorting attribute of whether each example of the character data matches at least one keyword which forms the disjunction of keyword selected, to thereby create a data sorting binary tree to the internal node of which the disjunction of keyword is labeled; and a data sorting apparatus including:
means for carrying out branching operations based on evaluation results obtained while evaluating the sorting attribute of whether the character data matches one keyword which forms the disjunctions of keywords labeled to the internal nodes of the data sorting tree, and sorting the input character data to a sorting class labeled to a leaf node of the data sorting tree finally arrived at after starting from an internal or root node of the data sorting tree created by the data sorting tree creator apparatus.

21. A data processing system for carrying out data processing to sort input character data, comprising:

a data sorting tree creator apparatus, including
means for creating keyword candidates, used to sort the input character data, from a list of examples of character data which can be sequentially expressed, where the keyword candidates are defined by the following formula $$s=min(u, v), s=s'a(a \in \Sigma) \; \exists t \in \exists \Sigma^1 \cup \Sigma^2 \cup \Sigma^3 - \cup \Sigma^n (s't=max(u, \mu))$$

where $u$, $\mu$ represent character strings forming derivatives;

$s'$ is obtained by removing an optional character string $a$ of a length 1 from $s$;

$t$ represents a character string;

$\Sigma^n$ is a collection of optional characters having a length of $n$ and $n$ is a positive integer;

means for creating disjunctions of the keyword candidates as the keyword candidates or logical sums thereof; and means for selecting a disjunction of keywords from those of the keyword candidates based on the evaluation results obtained while evaluating the sorting attribute of whether or not each example of the character data matches at least one keyword candidate which forms the disjunctions of the keyword candidates and labeling the derivatives representing character string to an internal node, and successively sorting examples of the character data based on the evaluation results obtained while evaluating the sorting attribute of whether each example of the character data matches at least one keyword which forms the disjunction of keyword selected, to thereby create a data sorting binary tree to the internal node of which the disjunction of keyword is labeled;

a data sorting apparatus including means for carrying out branching operations based on evaluation results obtained while evaluating the sorting attribute of whether the input character data matches at least one keyword which forms the disjunctions of keywords labeled to the internal nodes of the data sorting tree, and sorting the input character data to a sorting class labeled to a leaf node of the data sorting tree finally arrived at after starting from an internal or root node of the data sorting tree created by the data sorting tree creator apparatus; and a thesaurus creator apparatus including means for creating a thesaurus with a group of keywords, which form the disjunction, every keyword disjunction labeled to the root node or each internal node of the data sorting tree created by the data sorting tree creator apparatus.

22. A method of sorting input character data, comprising:

(a) storing a data sorting tree to internal nodes of which selected words or disjunctions of keywords are labeled, wherein the keywords are defined by the following formula $$s=min(u, v), s=s'a(a \in \Sigma) \; \exists t \in \exists \Sigma^1 \cup \Sigma^2 \cup \Sigma^3 - \cup \Sigma^n (s't=max(u, \mu))$$

where $u$, $\mu$ represent character strings forming derivatives;

$s'$ is obtained by removing an optional character string $a$ of a length 1 from $s$;

$t$ represents a character string;

$\Sigma^n$ is a collection of optional characters having a length of $n$ and $n$ is a positive integer;

(b) carrying out branching operations based on evaluation results obtained while evaluating a sorting attribute of whether the input character data matches at least one keyword which forms the disjunctions of keywords labeled to the internal nodes of the data sorting tree; and (c) sorting the input character data to a sorting class labeled to a leaf node of the data sorting tree finally arrived at after starting from an internal or root node of the data sorting tree.

23. A method of creating a data sorting tree to sort character data inputted, comprising:

(a) creating keyword candidates, which are used to sort the character data, from a list of examples of the character data which can be sequentially expressed, wherein the keyword candidates are defined by the following formula $$s=min(u, v), s=s'a(a \in \Sigma) \; \exists t \in \exists \Sigma^1 \cup \Sigma^2 \cup \Sigma^3 - \cup \Sigma^n (s't=max(u, \mu))$$

where $u$, $\mu$ represent character strings forming derivatives;

$s'$ is obtained by removing an optional character string $a$ of a length 1 from $s$;

$t$ represents a character string;

$\Sigma^n$ is a collection of optional characters having a length of $n$ and $n$ is a positive integer;

(b) creating disjunctions of the keyword candidates as the keyword candidates or logical sums thereof; and (c) selecting a disjunction of keywords from those of the keyword candidates based on the evaluation results obtained while evaluating the sorting attribute of whether each example of the character data matches at least one keyword candidate which form the disjunctions of the keyword candidates and labeling the derivatives representing character string to an internal node, and successively sorting examples of the character data based on the evaluation results obtained while evaluating the sorting attribute of whether each example of the character data matches at least one keyword which forms the disjunction of keyword selected, to thereby create a data sorting binary tree to the internal node of which the disjunction of keyword is labeled.

24. The data sorting tree creating method according to claim 23, whereby said data sorting tree is created by (d) deciding whether the rate at which labels attached to examples of the character data in the list of examples of the character data inputted are not same is smaller than a certain threshold value or whether the number of examples in the list of examples of the character data inputted is smaller than a certain threshold value;

(e) outputting a same label, which is the maximum number appearing in the list of examples of the character data inputted, as one for a leaf node of the data sorting tree and stopping the process, when the condition of a) is satisfied;

(f) selecting from the disjunctions of the keyword candidates created, one keyword disjunction, that is the best in certain evaluation results including those obtained by evaluating the sorting attribute of whether each example of the character data inputted matches at least one keyword candidate which forms the disjunctions of the keyword candidates created, and that has the largest number of characters, when the condition of a) is not satisfied;

(g) successively sorting examples of the character data based on evaluation results obtained by evaluating the sorting attribute of whether each example of the character data matches at least one keyword which forms the keyword disjunction selected by said selecting in step (f);

(h) recursively and repeatedly carrying out steps a)–d) relating to each list of examples of the character data sorted by said sorting in step (g); and (i) setting the keyword disjunction selected by said selecting in step (f) as a label for one of the internal nodes and labels or group of labels outputted as results of step (h) as those for branches connected to the internal node, when step (h) is stopped, and outputting these labels or group of labels and stopping the process.

25. A method of creating a thesaurus using a data sorting binary tree having a root node and internal nodes, each of which is labeled with a keyword disjunction, comprising:

creating the thesaurus with a group of keywords, which form disjunction, every keyword disjunction labeled to the root node or one of the internal nodes of the data sorting tree, wherein the keywords are defined by the following formula $$s=min(u, v), s=s'a(a\in\Sigma) \exists t\in \exists\Sigma^1\cup\Sigma^2\cup\Sigma^3-\cup\Sigma^n(s't=max(u, \mu))$$

where u, μ represent character strings forming derivatives;

s' is obtained by removing an optional character string a of a length 1 from s;

t represents a character string;

$\Sigma^n$ is a collection of optional characters having a length of n and n is a positive integer.

\* \* \* \* \*